(12) United States Patent
Streit

(10) Patent No.: US 12,443,392 B2
(45) Date of Patent: *Oct. 14, 2025

(54) SYSTEMS AND METHODS FOR PRIVATE AUTHENTICATION WITH HELPER NETWORKS

(71) Applicant: Private Identity LLC, Potomac, MD (US)

(72) Inventor: Scott Edward Streit, Woodbine, MD (US)

(73) Assignee: Private Identity LLC, Potomac, MD (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/977,066

(22) Filed: Oct. 31, 2022

(65) Prior Publication Data

US 2023/0176815 A1   Jun. 8, 2023

Related U.S. Application Data

(63) Continuation of application No. 17/398,555, filed on Aug. 10, 2021, now Pat. No. 11,489,866, which is a
(Continued)

(51) Int. Cl.
*H04L 9/40* (2022.01)
*G06F 7/02* (2006.01)
(Continued)

(52) U.S. Cl.
CPC .............. *G06F 7/02* (2013.01); *G06F 18/214* (2023.01); *G06N 3/04* (2013.01); *G06V 10/772* (2022.01);
(Continued)

(58) Field of Classification Search
CPC .............. H04L 63/1466; H04L 63/0236; H04L 63/1416; G06N 3/04; G06K 9/6256
(Continued)

(56) References Cited

U.S. PATENT DOCUMENTS 5,408,588 A    4/1995  Ulug
5,805,731 A *  9/1998  Yaeger ................. G06K 9/6278
                                                    382/157
(Continued)

FOREIGN PATENT DOCUMENTS

CA      3063126 A1    11/2018
CN    108376215 A      8/2018
(Continued)

OTHER PUBLICATIONS

International Preliminary Report on Patentability mailed Mar. 31, 2022, in connection with International Application No. PCT/US2020/050935.
(Continued)

*Primary Examiner* — Badri Narayanan Champakesan
(74) *Attorney, Agent, or Firm* — Wolf, Greenfield & Sacks, P.C.

(57) ABSTRACT

Helper neural network can play a role in augmenting authentication services that are based on neural network architectures. For example, helper networks are configured to operate as a gateway on identification information used to identify users, enroll users, and/or construct authentication models (e.g., embedding and/or prediction networks). Assuming, that both good and bad identification information samples are taken as part of identification information capture, the helper networks operate to filter out bad identification information prior to training, which prevents, for example, identification information that is valid but poorly captured from impacting identification, training, and/or prediction using various neural networks. Additionally, helper networks can also identify and prevent presentation attacks or submission of spoofed identification information as part of processing and/or validation.

18 Claims, 12 Drawing Sheets

Related U.S. Application Data continuation-in-part of application No. 17/183,950, filed on Feb. 24, 2021, now Pat. No. 11,122,078, and a continuation-in-part of application No. 17/155,890, filed on Jan. 22, 2021, now Pat. No. 11,789,699, which is a continuation-in-part of application No. 16/993,596, filed on Aug. 14, 2020, now Pat. No. 10,938,852, said application No. 17/183,950 is a continuation of application No. 16/993,596, filed on Aug. 14, 2020, now Pat. No. 10,938,852, said application No. 17/155,890 is a continuation-in-part of application No. 16/832,014, filed on Mar. 27, 2020, now Pat. No. 11,394,552, which is a continuation-in-part of application No. 16/573,851, filed on Sep. 17, 2019, now Pat. No. 11,502,841, which is a continuation-in-part of application No. 16/539,824, filed on Aug. 13, 2019, now Pat. No. 11,265,168, which is a continuation-in-part of application No. 16/218,139, filed on Dec. 12, 2018, now Pat. No. 11,210,375, said application No. 16/573,851 is a continuation-in-part of application No. 16/022,101, filed on Jun. 28, 2018, now Pat. No. 11,170,084, said application No. 16/218,139 is a continuation-in-part of application No. 15/914,562, filed on Mar. 7, 2018, now Pat. No. 11,392,802, and a continuation-in-part of application No. 15/914,942, filed on Mar. 7, 2018, now Pat. No. 10,721,070, said application No. 16/539,824 is a continuation-in-part of application No. 15/914,436, filed on Mar. 7, 2018, now Pat. No. 10,419,221, and a continuation-in-part of application No. 15/914,969, filed on Mar. 7, 2018, now Pat. No. 11,138,333, said application No. 16/218,139 is a continuation-in-part of application No. 15/914,969, filed on Mar. 7, 2018, now Pat. No. 11,138,333, said application No. 16/539,824 is a continuation-in-part of application No. 15/914,562, filed on Mar. 7, 2018, now Pat. No. 11,392,802, said application No. 16/573,851 is a continuation-in-part of application No. 15/914,436, filed on Mar. 7, 2018, now Pat. No. 10,419,221, said application No. 16/539,824 is a continuation-in-part of application No. 15/914,942, filed on Mar. 7, 2018, now Pat. No. 10,721,070.

(51) Int. Cl.

| | |
|---|---|
| *G06F 18/214* | (2023.01) |
| *G06N 3/04* | (2023.01) |
| *G06V 10/772* | (2022.01) |
| *G06V 10/774* | (2022.01) |
| *G06V 10/82* | (2022.01) |
| *G06V 10/98* | (2022.01) |
| *G06V 40/12* | (2022.01) |
| *G06V 40/16* | (2022.01) |
| *G06V 40/40* | (2022.01) |
| *G06V 40/70* | (2022.01) |

(52) U.S. Cl.
CPC ............ *G06V 10/774* (2022.01); *G06V 10/82* (2022.01); *G06V 10/993* (2022.01); *G06V 40/12* (2022.01); *G06V 40/16* (2022.01); *G06V 40/40* (2022.01); *G06V 40/70* (2022.01); *H04L 63/0236* (2013.01); *H04L 63/1416* (2013.01); *H04L 63/1466* (2013.01)

(58) Field of Classification Search
USPC ........................................................ 726/23
See application file for complete search history.

(56) References Cited

U.S. PATENT DOCUMENTS

| | | | |
|---|---|---|---|
| 5,838,812 A | 11/1998 | Pare, Jr. et al. | |
| 6,480,621 B1* | 11/2002 | Lyon | G06K 9/6256 |
| | | | 382/161 |
| 6,944,319 B1 | 9/2005 | Huang et al. | |
| 7,278,025 B2 | 10/2007 | Saito et al. | |
| 8,281,148 B2 | 10/2012 | Tuyls et al. | |
| 8,418,249 B1 | 4/2013 | Nucci et al. | |
| 8,856,541 B1* | 10/2014 | Chaudhury | G06V 40/67 |
| | | | 726/16 |
| 8,892,523 B2 | 11/2014 | Amarendran | |
| 8,924,928 B1 | 12/2014 | Belovich | |
| 8,955,129 B2 | 2/2015 | Cao | |
| 8,966,277 B2 | 2/2015 | Rane et al. | |
| 9,003,196 B2 | 4/2015 | Hoyos et al. | |
| 9,037,846 B2 | 5/2015 | Furukawa | |
| 9,043,417 B1 | 5/2015 | Jones | |
| 9,077,744 B2 | 7/2015 | Beutel | |
| 9,141,916 B1 | 9/2015 | Corrado et al. | |
| 9,191,411 B2 | 11/2015 | Foster | |
| 9,208,492 B2 | 12/2015 | Hoyos | |
| 9,213,997 B2 | 12/2015 | Chatterjee | |
| 9,313,200 B2 | 4/2016 | Hoyos | |
| 9,348,488 B1 | 5/2016 | Renema, II | |
| 9,390,327 B2* | 7/2016 | Gottemukkula | G06V 40/19 |
| 9,426,150 B2* | 8/2016 | Stern | H04L 63/0853 |
| 9,471,919 B2 | 10/2016 | Hoyos et al. | |
| 9,619,723 B1 | 4/2017 | Chow et al. | |
| 9,659,185 B2 | 5/2017 | Elovic | |
| 9,680,779 B2 | 6/2017 | Marovets | |
| 9,783,162 B2 | 10/2017 | Hoyos et al. | |
| 9,830,709 B2 | 11/2017 | Li et al. | |
| 9,838,388 B2 | 12/2017 | Mather et al. | |
| 9,886,501 B2 | 2/2018 | Krishnamurthy | |
| 10,075,289 B2 | 9/2018 | Laine et al. | |
| 10,108,902 B1 | 10/2018 | Lockett | |
| 10,110,738 B1* | 10/2018 | Sawant | G06N 3/0445 |
| 10,129,252 B1 | 11/2018 | Suen | |
| 10,180,339 B1 | 1/2019 | Long et al. | |
| 10,375,042 B2 | 8/2019 | Chaum | |
| 10,419,221 B1 | 9/2019 | Streit | |
| 10,467,526 B1 | 11/2019 | Appalaraju et al. | |
| 10,491,373 B2 | 11/2019 | Jain et al. | |
| 10,499,069 B2 | 12/2019 | Wang et al. | |
| 10,635,894 B1 | 4/2020 | Genner | |
| 10,721,070 B2 | 7/2020 | Streit | |
| 10,735,411 B1 | 8/2020 | Hardt et al. | |
| 10,757,207 B1 | 8/2020 | Kharwandikar | |
| 10,902,237 B1 | 1/2021 | Aggarwal et al. | |
| 10,938,852 B1* | 3/2021 | Streit | G06K 9/6255 |
| 11,112,078 B2 | 9/2021 | Jiang | |
| 11,122,078 B1* | 9/2021 | Streit | G06V 40/16 |
| 11,138,333 B2 | 10/2021 | Streit | |
| 11,170,084 B2 | 11/2021 | Streit | |
| 11,210,375 B2 | 12/2021 | Streit | |
| 11,281,664 B1 | 3/2022 | Paiz | |
| 11,288,530 B1 | 3/2022 | Genner | |
| 11,362,831 B2 | 6/2022 | Streit | |
| 11,392,802 B2 | 7/2022 | Streit | |
| 11,394,552 B2 | 7/2022 | Streit | |
| 11,489,866 B2 | 11/2022 | Streit | |
| 11,502,841 B2 | 11/2022 | Streit | |
| 11,562,181 B2 | 1/2023 | Chen et al. | |
| 11,562,255 B2 | 1/2023 | Johnson et al. | |
| 11,562,256 B2 | 1/2023 | Bai et al. | |
| 11,677,559 B2 | 6/2023 | Streit | |
| 11,762,967 B2 | 9/2023 | Streit | |
| 11,778,049 B1 | 10/2023 | Zamir | |
| 11,783,018 B2 | 10/2023 | Streit | |
| 11,789,699 B2* | 10/2023 | Streit | G06F 21/32 |
| | | | 726/23 |
| 11,790,066 B2* | 10/2023 | Streit | G06V 10/993 |
| 11,943,364 B2 | 3/2024 | Streit | |
| 12,206,783 B2 | 1/2025 | Streit | |
| 2002/0049685 A1 | 4/2002 | Yaginuma | |
| 2005/0138110 A1 | 6/2005 | Redlich et al. | |

(56) References Cited

U.S. PATENT DOCUMENTS

| | | |
|---|---|---|
| 2005/0149442 A1 | 7/2005 | Adams et al. |
| 2006/0228005 A1 | 10/2006 | Matsugu et al. |
| 2007/0155366 A1 | 7/2007 | Manohar et al. |
| 2007/0177773 A1* | 8/2007 | Hu .................... G06K 9/6255 382/119 |
| 2007/0220595 A1* | 9/2007 | M'raihi .............. H04L 63/1416 726/5 |
| 2007/0245152 A1 | 10/2007 | Pizano et al. |
| 2008/0113785 A1* | 5/2008 | Alderucci ............ A63F 13/332 463/29 |
| 2008/0113786 A1 | 5/2008 | Alderucci et al. |
| 2008/0235515 A1 | 9/2008 | Yedidia et al. |
| 2008/0247611 A1 | 10/2008 | Aisaka et al. |
| 2008/0307526 A1 | 12/2008 | Chung |
| 2009/0034803 A1 | 2/2009 | Matos |
| 2009/0328175 A1* | 12/2009 | Shuster .................. G06F 21/36 726/7 |
| 2010/0010968 A1 | 1/2010 | Redlich et al. |
| 2010/0131273 A1 | 5/2010 | Aley-Raz et al. |
| 2010/0162386 A1* | 6/2010 | Li .......................... G06F 21/32 726/19 |
| 2010/0180127 A1* | 7/2010 | Li ........................ H04L 9/3231 713/186 |
| 2011/0026781 A1 | 2/2011 | Osadchy et al. |
| 2012/0195475 A1 | 8/2012 | Abiko |
| 2012/0198549 A1 | 8/2012 | Antonakakis |
| 2013/0080166 A1 | 3/2013 | Buffum et al. |
| 2013/0142405 A1 | 6/2013 | Nada |
| 2013/0148868 A1 | 6/2013 | Troncoso Pastoriza et al. |
| 2013/0166296 A1* | 6/2013 | Scheffer ................ G06F 21/32 704/243 |
| 2013/0212049 A1 | 8/2013 | Maldonado |
| 2013/0273968 A1 | 10/2013 | Rhoads et al. |
| 2013/0307670 A1 | 11/2013 | Ramaci |
| 2013/0318351 A1 | 11/2013 | Hirano et al. |
| 2013/0340089 A1 | 12/2013 | Steinberg |
| 2014/0279774 A1 | 9/2014 | Wang et al. |
| 2014/0283061 A1* | 9/2014 | Quinlan .............. H04L 63/1408 726/23 |
| 2014/0304505 A1* | 10/2014 | Dawson .............. G06F 21/6227 713/165 |
| 2014/0317736 A1 | 10/2014 | Cao |
| 2014/0331059 A1 | 11/2014 | Rane et al. |
| 2014/0337930 A1* | 11/2014 | Hoyos ................ H04L 63/0861 726/4 |
| 2014/0358930 A1 | 12/2014 | Lerman |
| 2015/0170053 A1 | 6/2015 | Miao |
| 2015/0188941 A1 | 7/2015 | Boshmaf |
| 2015/0200958 A1 | 7/2015 | Muppidi et al. |
| 2015/0215312 A1 | 7/2015 | Cesnik |
| 2015/0264068 A1 | 9/2015 | Beauchesne |
| 2015/0310444 A1* | 10/2015 | Chen .................... G06Q 20/308 705/44 |
| 2015/0339477 A1 | 11/2015 | Abrams |
| 2015/0347820 A1 | 12/2015 | Yin et al. |
| 2016/0006673 A1 | 1/2016 | Thomas et al. |
| 2016/0078485 A1 | 3/2016 | Shim et al. |
| 2016/0127359 A1 | 5/2016 | Minter et al. |
| 2016/0140438 A1 | 5/2016 | Yang et al. |
| 2016/0164682 A1 | 6/2016 | Hartloff et al. |
| 2016/0337426 A1 | 11/2016 | Shribman et al. |
| 2016/0350648 A1* | 12/2016 | Gilad-Bachrach ... G06N 3/0481 |
| 2016/0371438 A1 | 12/2016 | Annulis |
| 2016/0373440 A1 | 12/2016 | Mather et al. |
| 2016/0379041 A1 | 12/2016 | Rhee et al. |
| 2016/0379044 A1 | 12/2016 | Tang et al. |
| 2017/0008168 A1 | 1/2017 | Weng et al. |
| 2017/0046563 A1 | 2/2017 | Kim et al. |
| 2017/0093851 A1 | 3/2017 | Allen |
| 2017/0098140 A1 | 4/2017 | Wang et al. |
| 2017/0126672 A1 | 5/2017 | Jang |
| 2017/0132526 A1 | 5/2017 | Cohen et al. |
| 2017/0169331 A1 | 6/2017 | Garner |
| 2017/0289168 A1* | 10/2017 | Bar ........................ G06F 21/316 |
| 2017/0357890 A1 | 12/2017 | Kim et al. |
| 2018/0005131 A1 | 1/2018 | Yin et al. |
| 2018/0018451 A1* | 1/2018 | Spizhevoy .......... H04L 63/0861 |
| 2018/0025243 A1 | 1/2018 | Chandraker et al. |
| 2018/0032844 A1 | 2/2018 | Yao et al. |
| 2018/0032997 A1 | 2/2018 | Gordon et al. |
| 2018/0046475 A1 | 2/2018 | Wei |
| 2018/0060552 A1 | 3/2018 | Pellom et al. |
| 2018/0082172 A1 | 3/2018 | Patel et al. |
| 2018/0117446 A1 | 5/2018 | Tran et al. |
| 2018/0121560 A1 | 5/2018 | Chen et al. |
| 2018/0121710 A1* | 5/2018 | Leizerson ................ G06T 7/90 |
| 2018/0137395 A1 | 5/2018 | Han et al. |
| 2018/0139054 A1 | 5/2018 | Chu et al. |
| 2018/0173861 A1 | 6/2018 | Guidotti et al. |
| 2018/0173980 A1 | 6/2018 | Fan et al. |
| 2018/0176216 A1 | 6/2018 | Mather et al. |
| 2018/0232508 A1 | 8/2018 | Kursun |
| 2018/0276488 A1 | 9/2018 | Yoo et al. |
| 2018/0293429 A1 | 10/2018 | Wechsler et al. |
| 2018/0293607 A1 | 10/2018 | Huddleston |
| 2018/0307815 A1* | 10/2018 | Samadani ............... G06F 21/32 |
| 2018/0330179 A1 | 11/2018 | Streit |
| 2018/0336472 A1 | 11/2018 | Ravi |
| 2018/0373979 A1 | 12/2018 | Wang et al. |
| 2019/0005126 A1 | 1/2019 | Chen et al. |
| 2019/0014148 A1 | 1/2019 | Foster |
| 2019/0019061 A1 | 1/2019 | Trenholm et al. |
| 2019/0020482 A1 | 1/2019 | Gupta et al. |
| 2019/0042895 A1 | 2/2019 | Liang et al. |
| 2019/0044723 A1 | 2/2019 | Prakash et al. |
| 2019/0068627 A1 | 2/2019 | Thampy |
| 2019/0080475 A1 | 3/2019 | Ma et al. |
| 2019/0122096 A1 | 4/2019 | Husain |
| 2019/0130168 A1 | 5/2019 | Khitrov et al. |
| 2019/0132344 A1* | 5/2019 | Lem ...................... G06N 5/022 |
| 2019/0147305 A1 | 5/2019 | Lu et al. |
| 2019/0147434 A1 | 5/2019 | Leung |
| 2019/0171908 A1 | 6/2019 | Salavon |
| 2019/0180090 A1* | 6/2019 | Jiang ................... A61B 5/7267 |
| 2019/0197331 A1 | 6/2019 | Kwak et al. |
| 2019/0205620 A1 | 7/2019 | Yi et al. |
| 2019/0215551 A1 | 7/2019 | Modarresi et al. |
| 2019/0225232 A1 | 7/2019 | Blau |
| 2019/0228248 A1 | 7/2019 | Han et al. |
| 2019/0236273 A1 | 8/2019 | Saxe et al. |
| 2019/0244138 A1 | 8/2019 | Bhowmick et al. |
| 2019/0253404 A1 | 8/2019 | Briceno et al. |
| 2019/0253431 A1* | 8/2019 | Atanda ................ G06Q 30/0201 |
| 2019/0258927 A1 | 8/2019 | Chen et al. |
| 2019/0272361 A1 | 9/2019 | Kursun et al. |
| 2019/0278894 A1 | 9/2019 | Andala et al. |
| 2019/0278895 A1 | 9/2019 | Streit |
| 2019/0278937 A1 | 9/2019 | Streit |
| 2019/0279047 A1 | 9/2019 | Streit |
| 2019/0280868 A1 | 9/2019 | Streit |
| 2019/0280869 A1 | 9/2019 | Streit |
| 2019/0286950 A1 | 9/2019 | Kiapour et al. |
| 2019/0294973 A1 | 9/2019 | Kannan et al. |
| 2019/0295223 A1 | 9/2019 | Shen et al. |
| 2019/0306731 A1* | 10/2019 | Raghuramu .......... H04L 63/102 |
| 2019/0318261 A1 | 10/2019 | Deng et al. |
| 2019/0332849 A1 | 10/2019 | Gupta et al. |
| 2019/0347432 A1* | 11/2019 | Boivie .................... G06F 21/72 |
| 2019/0354806 A1 | 11/2019 | Chhabra |
| 2019/0372754 A1 | 12/2019 | Gou et al. |
| 2019/0372947 A1* | 12/2019 | Penar ....................... G06N 3/08 |
| 2020/0004939 A1 | 1/2020 | Streit |
| 2020/0007931 A1* | 1/2020 | Ho ........................ G06N 20/00 |
| 2020/0014541 A1 | 1/2020 | Streit |
| 2020/0044852 A1 | 2/2020 | Streit |
| 2020/0097653 A1* | 3/2020 | Mehta .................... G06F 21/80 |
| 2020/0099508 A1 | 3/2020 | Ghorbani |
| 2020/0228336 A1 | 7/2020 | Streit |
| 2020/0228339 A1* | 7/2020 | Barham ................ H04L 9/0869 |
| 2020/0242506 A1 | 7/2020 | Kelly |
| 2020/0285737 A1 | 9/2020 | Kraus et al. |
| 2020/0351097 A1 | 11/2020 | Streit |
| 2020/0365143 A1* | 11/2020 | Ogawa ................ G06N 3/0445 |

(56) References Cited

U.S. PATENT DOCUMENTS

| | | |
|---|---|---|
| 2020/0387835 A1 | 12/2020 | Sandepudi et al. |
| 2021/0014039 A1 | 1/2021 | Zhang et al. |
| 2021/0065859 A1 | 3/2021 | McKinney et al. |
| 2021/0097158 A1 | 4/2021 | Lee et al. |
| 2021/0103783 A1 | 4/2021 | Wang et al. |
| 2021/0103937 A1 | 4/2021 | Joglekar et al. |
| 2021/0141007 A1 | 5/2021 | Gu et al. |
| 2021/0141896 A1 | 5/2021 | Streit |
| 2021/0224563 A1 | 7/2021 | Patel et al. |
| 2021/0319784 A1* | 10/2021 | Le Roux .......... G06F 21/55 |
| 2021/0374445 A1 | 12/2021 | Genner |
| 2021/0377298 A1 | 12/2021 | Streit |
| 2022/0058255 A1 | 2/2022 | Streit |
| 2022/0078206 A1 | 3/2022 | Streit |
| 2022/0100896 A1 | 3/2022 | Streit |
| 2022/0147602 A1 | 5/2022 | Streit |
| 2022/0147607 A1 | 5/2022 | Streit |
| 2022/0150068 A1 | 5/2022 | Streit |
| 2022/0229890 A1 | 7/2022 | Streit |
| 2022/0277064 A1 | 9/2022 | Streit |
| 2023/0025754 A1 | 1/2023 | Hassanzadeh et al. |
| 2023/0043127 A1 | 2/2023 | Streit |
| 2023/0070649 A1 | 3/2023 | Streit |
| 2023/0103695 A1 | 4/2023 | Streit |
| 2023/0106829 A1 | 4/2023 | Streit |
| 2023/0143874 A1 | 5/2023 | Lee et al. |
| 2023/0176815 A1 | 6/2023 | Streit |
| 2023/0283476 A1 | 9/2023 | Streit |
| 2023/0368026 A1 | 11/2023 | Cox et al. |
| 2024/0028951 A1 | 1/2024 | Willardson et al. |
| 2024/0048389 A1 | 2/2024 | Streit |
| 2024/0078300 A1 | 3/2024 | Streit |
| 2024/0211565 A1 | 6/2024 | Streit |
| 2024/0220594 A1 | 7/2024 | Streit |
| 2024/0248679 A1 | 7/2024 | Streit |
| 2024/0248973 A1 | 7/2024 | Streit |
| 2024/0346124 A1 | 10/2024 | Streit |

FOREIGN PATENT DOCUMENTS

| | | |
|---|---|---|
| EP | 2 833 294 A2 | 2/2015 |
| EP | 2784710 B1 | 6/2018 |
| WO | WO 2017/027320 A1 | 2/2017 |
| WO | WO 2019/173562 A1 | 9/2019 |
| WO | WO 2019/200264 A1 | 10/2019 |

OTHER PUBLICATIONS

Invitation to Pay Additional Fees mailed Jun. 24, 2019, in connection with International Application No. PCT/US2019/021100.
International Search Report and Written Opinion mailed Aug. 26, 2019, in connection with International Application No. PCT/US2019/021100.
International Search Report and Written Opinion mailed Sep. 30, 2019, in connection with International Application No. PCT/US2019/039537.
International Preliminary Report on Patentability mailed Sep. 17, 2020, in connection with International Application No. PCT/US2019/021100.
International Search Report and Written Opinion mailed Oct. 29, 2020, in connection with International Application No. PCT/US2020/046061.
Invitation to Pay Additional Fees mailed Dec. 3, 2020, in connection with International Application No. PCT/US2020/050935.
International Preliminary Report on Patentability mailed Jan. 7, 2021, in connection with International Application No. PCT/US2019/039537.
International Search Report and Written Opinion mailed Feb. 3, 2021, in connection with International Application No. PCT/US2020/050935.
International Search Report and Written Opinion mailed Nov. 15, 2021, in connection with International Application No. PCT/US2021/045745.
International Preliminary Report on Patentability mailed Feb. 23, 2023, in connection with International Application No. PCT/US2021/0458745.
International Preliminary Report on Patentability mailed Feb. 24, 2022, in connection with International Application No. PCT/US2020/046061.
European Examination Report dated Oct. 10, 2022, in connection with European Application No. 19712657.6.
Al-Waisy et al., A Multimodal Biometric System for Personal Identification Based on Deep Learning Approaches.2017 Seventh International Conference on Emerging Security Technologies (EST). 2017 IEEE. 2017; pp. 162-168.
Chamatidis et al., Using deep learning neural networks for ECG based authentication. 2017 international Carnahan conference on security technology (ICCST) Oct. 23, 2017. 6 pages.
Chen et al., Deep ranking for person re-identification via joint representation learning. IEEE Transactions on Image Processing. Mar. 23, 2016;25(5):2353-67.
Chen et al., Learning Multi-channel Deep Feature Representations for Face Recognition. JMLT: Workshop and Conference Proceedings. 2015:44;60-71.
Graepel et al "ML Confidential: Machine Learning on Encrypted Data", 2012, SpringerOVeralg Berlin Heidelberg 2013, pp. 1-21 ( Year: 2013).
Inamdar et al., Real-Time Face Mask Identification Using Facemasknet Deep Learning Network. Available at SSRN 3663305. Jul. 2, 20209;7 pages.
Kurban et al., A Multi-Biometric Recognition System Based On Deep Features of Face and Gesture Energy Image. 2017 IEEE International Conference on Innovations in Intelligent. Systems and Applications. 2017; 4 pages. https://ieeexplore.ieee.org/stamp/stamp.jsp?tp=&arnumber=8001186.
Lu et al., Discriminative Deep Metric Learning for Face and Kinship Verification. IEEE Transactions on Image Processing. 2017; 26 (9): 4269-4282.
Ma et al., A Secure Face-Verification Scheme Based on Homomorphic Encryption and Deep Neural Networks. IEEE. Sep. 6, 2017: 5:16532-16538.
Rattani et al., Multi-biometic Convoutional NeuralNetworks for Mobile User Authentication. 2018 IEEE International Symposium on Technologies for Homeland Security (HST). 2018; pp. 1-6.
Streit et al., Privacy Enabled Biometric Search. ArXiv e-prints. Aug. 16, 2017. 7 pages.
Stuhlsatz et al., Feature Extraction with Deep Neural Networks by a Generalized Discriminant Analysis. IEEE Transactions on Neural Networks and Learning Systems. Apr. 2012; 23(4): 596-608.
Wang et al., End-to-end encrypted traffic classification with one-dimensional convolution neural networks. 2017 IEEE International Conference on Intelligence and Security Informatics (ISI). 6 pages.
Xie et al "Crypto-Nets: Neural Networks over Encrypted data", 2014, ICLR pp. 1-9 (Year: 2014).
Zhang et al., Bit-scalable deep hashing with regularized similarity learning for image retrieval and person re-identification. IEEE Transactions on Image Processing. Aug. 11, 2015;24(12):4766-79.
Zhang et al., Face Detection Based on Multi Task Learning and Multi Layer Feature Fusion. 2017 6th International Conference on Computer Science and Network Technology (ICCSNT). 2017: 289-293.
Canadian Examination Report dated Apr. 3, 2024, in connection with Canadian Application No. 3,092,941.
Yang et al., Chaotic Encryption Algorithm Against Chosen-Plaintext Attacks in Optical OFDM Transmission. IEEE Photonics Technology Letters. 2016.28(22).
Australian Examination Report No. 1 dated Jul. 24, 2023, in connection with Australian Application No. 2019230043.
Extended European Search Report dated Jul. 14, 2023, in connection with European Application No. 20852611.1.
Extended European Search Report dated Sep. 5, 2023, in connection with European Application No. 20865304.8.
Boddeti, Secure Face Matching Using Fully Homomorphic Encryption. IEEE 9th International Conference on Biometrics Theory, Applications and Systems (BTAS). Oct. 22, 2018: 1-10.

(56) References Cited

OTHER PUBLICATIONS

Lagendijk et al., Encrypted Signal Processing for Privacy Protection: Conveying the Utility of Homomorphic Encryption and Multiparty Computation. IEEE Signal Processing Magazine. Jan. 1, 2013;30(1):82-105.

Tran et al., Disentangled Representation Learning GAN for Pose-Invariant Face Recognition. 2017 IEEE Conference on Computer Vision and Pattern Recognition (CVPR). pp. 1283-1292.

Extended European Search Report dated Aug. 12, 2024, in connection with European Application No. EP 21856719.6.

Barni et al., Privacy-Preserving ECG Classification With Branching Programs and Neural Networks. IEEE Transactions on information Forensics and Security. Jun. 2011;6(2):452-68

Basu et al., User-in-a-context; a blueprint for context-aware identification. 14th Annual Conference on Privacy, Security and Trust (PST). 2016, pp. 329-334 doi: 10.1109/PST.2016.7906982.

*Brian Streit, Ph.D.* v. *Private Identity LLC (f.k.a. Open Inference Holdings LLC)* Dist. CT. ME, 8:23-cv-2031.

Chatzidakis et al., Chaotic Neural Networks for Intelligent Signal encryption. ISA 2014. The 5th International Conference on Information, Intelligence, Systems and Applications. 6 Pages.

Choubey et al., Secure Remote User Authentication for Multi-Server Environment using Machine Learning Technique. International Conference on Circuit, Power, and Computing Technologies [ICCPCT]. 2016. 5 Pages.

Hema et al., Mouse Behavior Based Multi-Factor Authentication using Neural Networks. 2016 International Conference on Circuit, Power and Computing (ICCPCT). 2016, pp. 1-8. doi: 10.1109/ICCPCT.2016.7530312.

Ligier et al., Information leakage analysis of inner-product functional encryption based data classification. 2017 15th Annual Conference on Privacy, Security and Trust (PST). 2017. 6 pages.

Picek et al. Side-Channel analysis and machine learning: A practical perspective. International Join Conference Neural Networks (IJCNN). 2017. 8 Pages.

Sadeghian et al., Chosen Plaintext Attack against Neural Network-Based Symmetric Ciper. Proceedings of International Joint Conference on Neural Networks. Aug. 12, 2007. 5 Pages.

Satonaka, Biometric Watermark Authentication With Multiple Verification Rule. Proceedings of the 12th IEEE Workshop on Neural Networks for Signal Processing. 2002. 13 Pages.

Xu et al, Developing a Courses Module for Teaching Cryptography Programming on Android. 2015 IEEE Frontiers in Education Conference. (FIE). 2015. pp 1-4. doi:10.1109/FIE.2015.7344086.

Dileep et al., Identification of Block Ciphers using Support Vector Machines. 2006 International Joint Conference on Neural Networks. Jul. 16, 2006:2696-01.

\* cited by examiner

SYSTEMS AND METHODS FOR PRIVATE AUTHENTICATION WITH HELPER NETWORKS

RELATED APPLICATIONS

This Application is a Continuation of U.S. application Ser. No. 17/398,555, filed Aug. 10, 2021, entitled "SYSTEMS AND METHODS FOR PRIVATE AUTHENTICATION WITH HELPER NETWORKS", which is a Continuation-in-part of U.S. application Ser. No. 17/183,950, filed Feb. 24, 2021, entitled "SYSTEMS AND METHODS FOR PRIVATE AUTHENTICATION WITH HELPER NETWORKS", which is a Continuation of U.S. application Ser. No. 16/993,596, filed Aug. 14, 2020, entitled "SYSTEMS AND METHODS FOR PRIVATE AUTHENTICATION WITH HELPER NETWORKS". Application Ser. No. 17/398,555 is a Continuation-in-part of U.S. application Ser. No. 17/155,890, filed Jan. 22, 2021, entitled "SYSTEMS AND METHODS FOR PRIVATE AUTHENTICATION WITH HELPER NETWORKS", which is a Continuation-in-part of U.S. application Ser. No. 16/993,596, filed Aug. 14, 2020, entitled "SYSTEMS AND METHODS FOR PRIVATE AUTHENTICATION WITH HELPER NETWORKS". Application Ser. No. 17/155,890 is a Continuation-in-part of U.S. application Ser. No. 16/832,014, filed Mar. 27, 2020, entitled "SYSTEMS AND METHODS FOR PRIVACY-ENABLED BIOMETRIC PROCESSING", which is a Continuation-in-part of U.S. application Ser. No. 16/573,851, filed Sep. 17, 2019, entitled "SYSTEMS AND METHODS FOR PRIVACY-ENABLED BIOMETRIC PROCESSING", which is a Continuation-in-part of U.S. application Ser. No. 16/539,824, filed Aug. 13, 2019, entitled "SYSTEMS AND METHODS FOR PRIVACY-ENABLED BIOMETRIC PROCESSING", which is a Continuation-in-part of U.S. application Ser. No. 16/218,139, filed Dec. 12, 2018, entitled "SYSTEMS AND METHODS FOR BIOMETRIC PROCESSING WITH LIVENESS", which is a Continuation-in-part of U.S. application Ser. No. 15/914,562, filed Mar. 7, 2018, entitled "SYSTEMS AND METHODS FOR PRIVACY-ENABLED BIOMETRIC PROCESSING". Application Ser. No. 16/218139 is a Continuation-in-part of U.S. application Ser. No. 15/914,942, filed Mar. 7, 2018, entitled "SYSTEMS AND METHODS FOR PRIVACY-ENABLED BIOMETRIC PROCESSING". Application Ser. No. 16/218139 is a Continuation-in-part of U.S. application Ser. No. 15/914,969, filed Mar. 7, 2018, entitled "SYSTEMS AND METHODS FOR PRIVACY-ENABLED BIOMETRIC PROCESSING". Application Ser. No. 16/539824 is a Continuation-in-part of U.S. application Ser. No. 15/914,436, filed Mar. 7, 2018, entitled "SYSTEMS AND METHODS FOR PRIVACY-ENABLED BIOMETRIC PROCESSING". Application Ser. No. 16/539824 is a Continuation-in-part of U.S. application Ser. No. 15/914,562, filed Mar. 7, 2018, entitled "SYSTEMS AND METHODS FOR PRIVACY-ENABLED BIOMETRIC PROCESSING". Application Ser. No. 16/539824 is a Continuation-in-part of U.S. application Ser. No. 15/914,942, filed Mar. 7, 2018, entitled "SYSTEMS AND METHODS FOR PRIVACY-ENABLED BIOMETRIC PROCESSING". Application Ser. No. 16/539824 is a Continuation-in-part of U.S. application Ser. No. 15/914,969, filed Mar. 7, 2018, entitled "SYSTEMS AND METHODS FOR PRIVACY-ENABLED BIOMETRIC PROCESSING". Application Ser. No. 16/573851 is a Continuation-in-part of U.S. application Ser. No. 16/022,101, filed Jun. 28, 2018, entitled "BIOMETRIC AUTHENTICATION". Application Ser. No. 16/573851 is a Continuation-in-part of U.S. application Ser. No. 15/914,436, filed Mar. 7, 2018, entitled "SYSTEMS AND METHODS FOR PRIVACY-ENABLED BIOMETRIC PROCESSING." Each of the foregoing applications are incorporated herein by reference in their entirety.

BACKGROUND

Various conventional approaches exist that attempt to implement authentication and/or identification in the context of machine learning. Some conventional approaches have developed optimizations to improve the training and predictive accuracy of the machine learning models. For example, a number of solutions use procedural programming to prepare data for processing by machine learning models. In one example, procedural programming can be used to process user images (e.g., face images) to crop or align images around user faces, to improve the image data used to train machine learning models to recognize the users. A number of approaches exist to filter training data sets to improve the training of respective machine learning models based on procedural programming or rules.

SUMMARY

The inventors have realized that there is still a need to utilize the power of machine learning models as gateways or filters on data being used for subsequent machine learning based recognition whether in authentication settings or identification settings. A similar need exists in the context of procedural recognition and other processing tasks, and machine learning models can be used as gateways or filters on data being used for any subsequent operation, including for example, procedural based or other recognition tasks whether in authentication or identification settings. According to some aspects, using machine learning to filter data or remove bad data instances enables any subsequent operation to be performed more effectively and/or with reduced error over many conventional approaches. For example, recognition operations (e.g. identity, authentication, and/or enrollment, etc.) can be improved by validating the data used, and/or identifying invalid data before further processing occurs. It is further realized that approaches to filter data based on procedural programming fail to achieve the level of filtering required, and further fail to provide a good balance between processing requirements and accuracy.

According to various aspects, provided are authentication systems that are configured to leverage machine learning approaches in the context of pre-processing data for use in subsequent tasks, for example, recognition tasks (including e.g., recognition by machine learning models that support identification and/or authentication). The inventors have further realized that, unlike prior solutions, it is possible to create lightweight models (e.g., small file size models) that provide sufficient accuracy (e.g., >90%) in identifying features or states of input identification/authentication data to serve as a gateway for further processing. For example, the system can implement a plurality of helper networks configured to process incoming identification data (e.g., biometrics, behavioral, passive, active, etc.) and exclude data instances that would not improve identification/authentication. For example, a helper network can be trained on identification data to ensure that "good" data improves the ability to distinguish between targets to be identified or expands the circumstances (e.g., poor lighting conditions, noisy environment, bad image capture, etc.) in which subsequent operations can identify or authenticate a target. Stated broadly various embodiment validate the data used for subsequent processing, eliminating, for example, poor data instances, malicious data instances, etc.

In further example, the helper network can be trained to identify "bad" data which if used would result in a reduction in the ability to recognize a target. To illustrate, an image of a first target that is too blurry may make the blurry image of the first target resemble an image of another target. If used in a recognition data set, the result could be a reduction in the ability to distinguish between the first target and another target because of an image of the first target that, inappropriately, bears a closer resemblance to another target than the first. Various instances of the helper networks are configured to identify and validate good data for use in recognition tasks, and identify and, for example, discard bad data that would reduce the ability to perform a recognition task.

According to some embodiments, the helper networks validate submitted identification information as good or bad data and filter the bad data from use in subsequent operations, for example, identification, authentication, enrollment, training, and in some examples, prediction.

In further embodiments, helper networks can be implemented in an authentication system and operate as a gateway for embedding neural networks, where the embedding neural networks are configured to extract encrypted features from authentication information. The helper network can also operate as a gateway for prediction models that predict matches between input and enrolled authentication information. In other examples, the helper networks can be configured to filter identification data for any recognition task (e.g., identification, authentication, enrollment, etc.), which can be based in machine learning approaches, procedural programming approaches, etc.

According to various aspects, embedding machine learning models are used to generate encrypted embeddings from input plaintext identification information. The embedding machine learning models can be tailored to respective authentication modalities, and similarly, helper networks can be configured to process specific authentication inputs or authentication modalities and validate the same before they are used in subsequent models. An authentication modality can be associated with the sensor/system used to capture the authentication information (e.g., image capture for face, iris, or fingerprint, audio capture for voice, etc.), and may be further limited based on the type of information being analyzed within a data capture (e.g., face, iris, fingerprint, voice, behavior, etc.). Broadly stated, authentication modality refers to the capability in the first instance to identify a subject to confirm an assertion of identity and/or to authenticate the subject to adjudicate identity and/or authorization based on a common set of identity information. In one example, an authentication modality can collect facial images to train a neural network on a common authentication data input. In another example, speech inputs or more generally audio inputs can be processed by a first network, where another physical biometric input (e.g., face, iris, etc.) can be processed by another network trained on the different authentication modality. In further example, image captures for user faces can be processed as a different modality from image capture for iris identification, and/or fingerprint identification. Other authentication modalities can include behavioral identification information (e.g., speech pattern, movement patterns (e.g., angle of carrying mobile device, etc.), timing of activity, location of activity, etc.), passive identification information capture, active identification information capture, among other options.

According to another aspect, helper networks, also referred to as pre-processing neural networks and/or validation networks, are configured to operate as a gateway on identification information used to identify and/or authenticate entities. Assuming, that both good and bad identification information samples are taken as part of information capture, the helper networks operate to filter out bad information, for example, prior to training, which prevents, for example, information that is valid but poorly captured from impacting training or prediction using various neural networks. Additionally, helper networks can also identify and prevent presentation attacks or submission of spoofed authentication. In various embodiments, filtering bad identification information samples can be used to improve machine learning identification, enrollment, and/or authentication operations as well as procedural based identification, enrollment, and/or authentication operations.

According to various aspects, training of machine learning models typically involves expansion and generation of variants of training data. These operations increase the size of the training data pool and improve the accuracy of the trained model. However, the inventors have realized that including bad data in such expanded training data sets compromises accuracy. Worse, capturing and expanding bad instances of data can multiply the detrimental effect. According to various embodiments, data validation by helper networks identifies and eliminates data that would reduce identification or authentication accuracy (i.e. bad data). Unexpectedly, the helper networks are also able to identify bad data in this context that is undetected by human perception. This allows various embodiments to yield capability that cannot naturally be produced in a procedural programming context, where a programmer is attempting to code human based analysis (limited by human perception) of identification data.

In further aspects, the authentication system can be configured to leverage a plurality of helper neural networks (e.g., a plurality of neural networks (e.g., deep neural networks (e.g., DNNs))), where sets of helper networks can be trained to acquire and transform biometric values or types of biometrics to improve biometric capture, increase accuracy, reduce training time for embedding and/or classification networks, eliminate vulnerabilities (e.g., liveness checking and validation), and further sets of helper networks can be used to validate any type or modality of identification input. In further example, data is validated if it improves the accuracy or capability of recognition operations (e.g., improves feature embedding models, prediction models, distance evaluations, etc.). In some embodiments, by only using validated data, downstream recognition tasks can be improved over conventional approaches.

According to one aspect, an authentication system for privacy-enabled authentication is provided. The system comprises at least one processor operatively connected to a memory; an authentication data gateway, executed by the at least one processor, configured to filter invalid identification information, the authentication data gateway comprising at least a first pre-trained geometry helper network configured to process identification information of a first type, accept as input unencrypted identification information of the first type, and output processed identification information of the first type; and a first pre-trained validation helper network associated with the geometry helper network configured to process identification information of the first type, accept the output of the geometry helper neural network, and validate the input identification information of the first type or reject the identification information of the first type.

According to one embodiment, the authentication data gateway is configured to filter bad authentication data from training data sets used to build embedding network models. According to one embodiment, the first pre-trained validation helper network is trained on evaluation criteria independent of the subject seeking to be enrolled or authenticated. According to one embodiment, the authentication data gateway further comprises at least a second geometry helper network and a second validation helper network pair configured to process and valid identification information of a second type. According to one embodiment, the authentication data gateway further comprises a plurality of validation helper networks each associated with a respective type of identification information, wherein each of the plurality of validation helper networks generate a binary evaluation of respective authentication inputs to establish validity. According to one embodiment, the first pre-trained validation helper network is configured process an image input as identification information, and output a probability that the image input is invalid. According to one embodiment, the first pre-trained validation helper network is configured to process an image input as identification information, and output a probability that the image input is a presentation attack. According to one embodiment, the first pre-trained validation helper network is configured to process a video input as identification information and output a probability that the video input is invalid. According to one embodiment, the first pre-trained validation helper network is configured to process a video input as identification information and output a probability that the video input is a presentation attack.

According to one aspect, an authentication system for privacy-enabled authentication is provided. The system comprises at least one processor operatively connected to a memory; an authentication data gateway, executed by the at least one processor, configured to filter invalid identification information, the authentication data gateway comprising at least a merged validation network associated with a first type of identification information, the merged validation network configured to process identification information of the first type and output a probability that the identification information of the first type is valid for use in enrolling a user for subsequent identification or a probability that the identification information is invalid.

According to one embodiment, the merged validation network is configured to test a plurality of binary characteristics of the identification information input. According to one embodiment, the output probability is based at least in part on a state determined for the plurality of binary characteristics. According to one embodiment, the merged validation network is configured to determine if an identification information input is based on a presentation attack. According to one embodiment, the merged validation network is configured to determine if an identification information input improves training set entropy.

According to one aspect, a computer implemented method for privacy-enabled authentication is provided. The method comprises filtering, by at least one processor, invalid identification information; executing by the at least one processor, a first pre-trained geometry helper network; accepting, by the first pre-trained geometry helper network, unencrypted identification information of the first type as input; generating processed identification information of the first type; executing by the at least one processor, a first pre-trained validation helper network; accepting the output of the geometry helper neural network; and validating the input identification information of the first type or reject the identification information of the first type.

According to one embodiment, the method further comprises filtering bad authentication data from training data sets used to build embedding network models. According to one embodiment, the method further comprises training the first pre-trained validation helper network on evaluation criteria independent of the subject seeking to be enrolled or authenticated. According to one embodiment, the method further comprises executing at least a second geometry helper network and a second validation helper network pair configured to process and validate identification information of a second type. According to one embodiment, the method further comprises executing a plurality of validation helper networks each associated with a respective type of identification information, and generating a binary evaluation of respective authentication inputs by respective ones of the plurality of validation helper networks to establish validity. According to one embodiment, the method further comprises processing, by the first pre-trained validation helper network an image input as identification information, and output a probability that the image input is invalid.

According to one embodiment, the method further comprises processing an image input as identification information, and generating a probability that the image input is a presentation attack, by the first pre-trained validation helper network. According to one embodiment, the method further comprises processing, the first pre-trained validation helper network, a video input as identification information; and generating, the first pre-trained validation helper network, a probability that the video input is invalid, by the first pre-trained validation helper network. According to one embodiment, the method further comprises processing, the first pre-trained validation helper network, a video input as identification information, and generating, the first pre-trained validation helper network, a probability that the video input is a presentation attack.

According to one aspect, an authentication system for privacy-enabled authentication is provided. The method comprises executing, by at least one processor, a merged validation network associated with a first type of identification information; processing, by the merged validation network, identification information of the first type, generating, by the merged validation network, a probability that the identification information of the first type is valid for use in enrolling a user for subsequent identification or a probability that the identification information is invalid. According to one embodiment, the method further comprises testing, by the merged validation network, a plurality of binary characteristics of the identification information input. According to one embodiment, generating the probability is based at least in part on a state determined for the plurality of binary characteristics. According to one embodiment, the method further comprises determining, by the merged validation network if an identification information input is based on a presentation attack. According to one embodiment, the method further comprises determining if an identification information input improves training set entropy.

According to one aspect, a system for managing privacy-enabled identification or authentication is provided. The system comprises at least one processor operatively connected to a memory; an identification data gateway, executed by the at least one processor, configured to filter invalid identification information from subsequent verification, enrollment, identification, or authentication functions, the identification data gateway comprising at least a first pre-trained validation helper network associated with identification information of a first type, wherein the first pre-trained validation helper network is configured to evaluate an identification instance of the first type, responsive to input of the identification instance of the first type to the first pre-trained validation helper network, wherein the first pre-trained validation helper network is pre-trained on evaluation criteria that is independent of a subject of the identification instance seeking to be enrolled, identified, or authenticated, responsive to a determination that the identification instance meets the evaluation criteria, validate the identification instance for use in subsequent verification, enrollment, identification, or authentication, responsive to a determination that the identification instance fails the evaluation criteria, reject the unknown information instance for use in subsequent verification, enrollment, identification, or authentication, and generate at least a binary evaluation of the identification information instance based on the determination of the evaluation criteria, wherein the at least the binary evaluation includes generation of an output probability by the first pre-trained validation helper network that the identification instance is valid or invalid.

According to one embodiment, the identification data gateway is configured to filter bad audio data from use in subsequent processing. According to one embodiment, the identification data gateway is configured to accept audio data input and validate the audio input for use in transcription. According to one embodiment, the first pre-trained validation helper network is trained on presence data, and configured to determine the presence of a target to be evaluated. According to one embodiment, the first pre-trained validation helper network is configured to validate the presence data independent of the subject seeking to be enrolled, identified, or authenticated. According to one embodiment, the authentication data gateway further comprises a plurality of validation helper networks each associated with a respective type of identification information, wherein each of the plurality of validation helper networks generate a binary evaluation of respective identification inputs to establish validity, wherein at least a plurality of the validation helper networks are configured to validate respective identification information independent of the subject seeking to be enrolled, identified, or authenticated. According to one embodiment, the first pre-trained validation helper network is configured process an image as identification information, and output a probability that the subject is wearing a mask. According to one embodiment, the first pre-trained validation helper network is configured to determine the mask is being worn properly by the subject. According to one embodiment, the first pre-trained validation helper network is configured to determine the mask is being worn properly by the subject irrespective of the subject to be identified. According to one embodiment, the first pre-trained validation helper network is configured to process location associated input as identification information, and output a probability that the location associated input is invalid.

According to one aspect, a computer implemented method for managing privacy-enabled identification or authentication is provided. The system comprises filtering, by at least one processor, invalid identification information from subsequent verification, enrollment, identification, or authentication functions, wherein the act of filtering includes executing, by the at least one processor, a first pre-trained validation helper network associated with identification information of a first type; evaluating, by the first pre-trained validation helper network, an identification instance of the first type, responsive to input of the identification instance of the first type to the first pre-trained validation helper network, wherein the first pre-trained validation helper network is pre-trained on evaluation criteria that is independent of a subject of the identification instance seeking to be verified, enrolled, identified, or authenticated; validating, by the at least one processor, the identification instance for use in subsequent verification, enrollment, identification, or authentication, in response to determining that the identification instance meets the evaluation criteria; rejecting, by the at least one processor, the unknown information instance for use in subsequent verification, enrollment, identification, or authentication responsive to determining that the identification instance fails the evaluation criteria; and generating, by the at least one processor, at least a binary evaluation of the identification instance based on the determination of the evaluation criteria, wherein the at least the binary evaluation includes generation of an output probability by the first pre-trained validation helper network that the identification instance is valid or invalid.

According to one embodiment, the act of filtering includes an act of filtering bad audio data from use in subsequent processing. According to one embodiment, the method further comprises accepting audio data input and validating the audio input for use in transcription. According to one embodiment, the first pre-trained validation helper network is trained on presence data, and the method further comprises determining the presence of a valid target to be evaluated. According to one embodiment, the method further comprises validating the presence data independent of the subject seeking to be verified, enrolled, identified, or authenticated. According to one embodiment, the method further comprises executing a plurality of validation helper networks each associated with a respective type of identification information, wherein each of the plurality of validation helper networks generates at least a binary evaluation of respective identification inputs to establish validity; and validating respective identification information independent of the subject seeking to be verified, enrolled, identified, or authenticated.

According to one embodiment, the first pre-trained validation helper network is configured process an image as identification information, and the method further comprises an act of outputting a probability that the subject is wearing a mask. According to one embodiment, the method further comprises determining by the first pre-trained validation helper network that the mask is being worn properly by the subject. According to one embodiment, the method further comprises determining by the first pre-trained validation helper network that the mask is being worn properly by the subject irrespective of the subject to be identified. According to one embodiment, method further comprises processing a location associated input as identification information by the first pre-trained validation helper network and generating by the first pre-trained validation helper network a probability that the location associated input is invalid.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments and are incorporated in and constitute a part of this specification but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
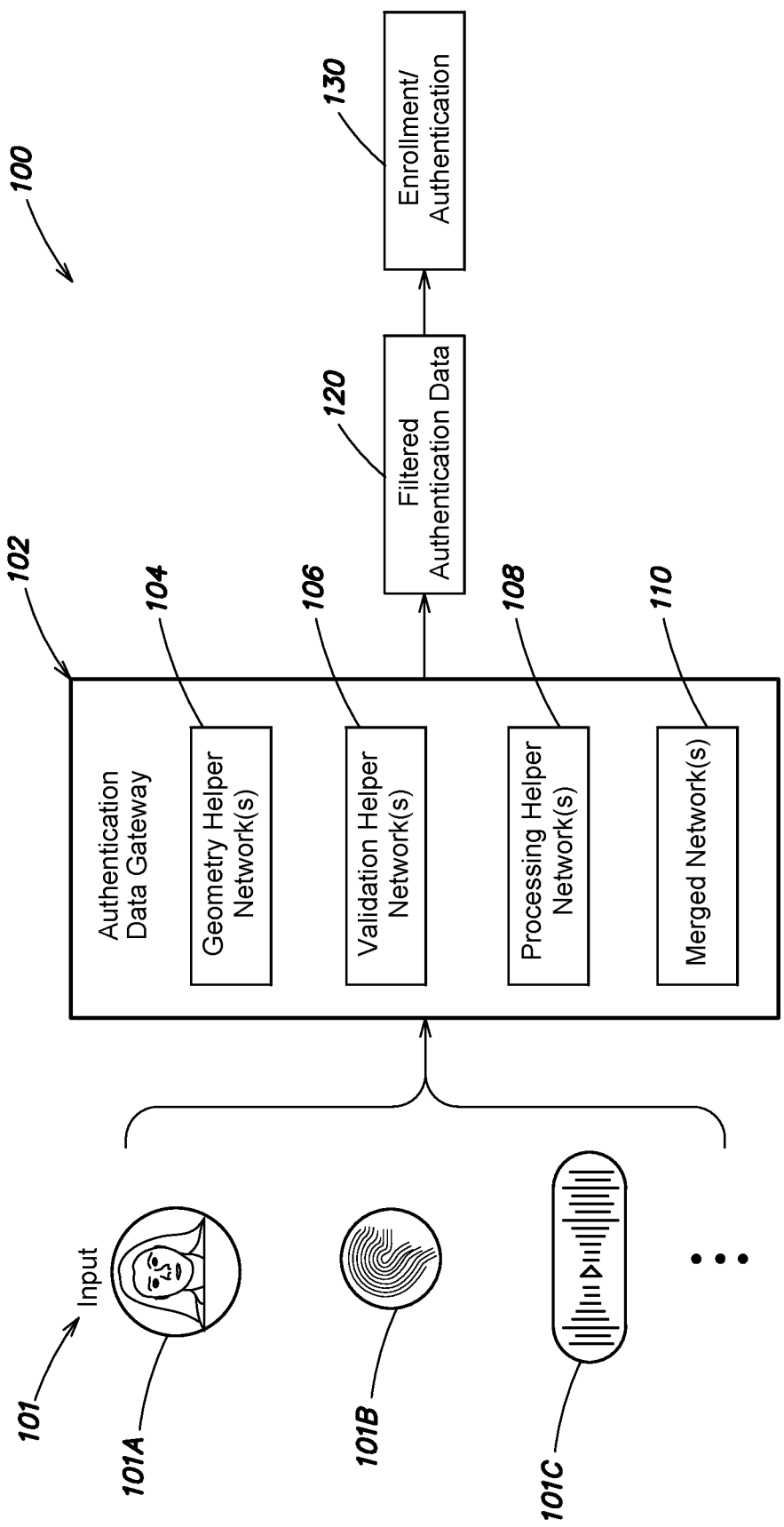
FIG. 1 is a block diagram of a helper network implementation, according to one embodiment.

According to some embodiments, validation and generation of identification information can be supported by execution of various helper networks. According to one embodiment, these specially configured helper networks can be architected based on the type of identification information/credential to be processed or more generally based on an authentication modality being processed. Various embodiments describe example functions with respect to authentication and authentication systems. The nomenclature "authentication system" is used for illustration, and in various embodiments describes systems that perform identification operations that employ helper networks in the context of identifying an entity or subject, and the disclosed operations should be understood to encompass data validation in the context of identification. The described examples and embodiments can also be used for authentication where identification is a first step, and adjudication of the identity and/or permissions for the entity is required or desired.

In various embodiments, the system can execute a plurality of helper networks that are configured to filter inputs (including, for example, inputs to training models) that are later used in authentication or identification. For example, geometry helper networks can be executed to facilitate analysis of features within authentication information, by identifying salient features and, for example, providing location information. In various embodiments, examples are described to process authentication information, and are not intended to limit the operations on the input to authentication assertions, but rather include operations that include identification, and identification with authentication.

According to one embodiment, validation helper networks are configured to determine that an identification sample is a good identification and/or authentication sample. For example, only identification samples that improve accuracy or expand recognition can be validated. The validation network can, for example, identify that a face image is too blurry for use, the image of the user has been taken in poor lighting conditions, the imaged face is too far away from the capture device, the imaged face is obscured, the imaged face is too near to the capture device, the imaged face is out of focus, the imaged face is looking away from the camera, among other options. In various examples, the helper networks are pre-trained using bad identification samples. For example, the bad identification samples are identified as samples that reduce the entropy of the resulting data set. To illustrate, if a blurry image of a first user is used to create encrypted features, the resulting encrypted features will then match on more encrypted features, and which may include matches reflecting source identification information not of the first user—this is an example of reduced identification entropy. In another example, the helper networks are pre-trained on bad identification samples that reduce or hamper the execution or efficiency of subsequent processing.

In further example, various state determinations can be used to identify data instances that reduce the effectiveness of recognition operations and then exclude such bad identification information (e.g., a face image from an identification data set). Stated more generally, the validation helper networks are configured to weed out bad identification data and prevent bad data from impacting subsequent operations, including for example, training of machine learning models for various identification and/or authentication scenarios or other subsequent processing scenarios. In further embodiments, the validation helper networks can be configured to validate data instances whose use and/or incorporation into a body of identification data will result in improvement in recognition circumstances and/or processing accuracy. In some examples, the validation helper networks are trained to identify identification data instances that improve identification entropy.

In further examples, some helper networks include a face plus mask helper network tailored to operate on identification instances of facial images, where the identification target is wearing a mask, mask on/off detection helper network, eyeglasses on/off detection helper network, fingerprint validation network, eye geometry helper network, eyes open/closed detection helper network, training data helper networks, eye validation helper network, etc. In various embodiments, the helper networks are configured to: improve processing of identification credentials, for example, to eliminate noise in processed credentials; ensure valid credentials are captured, including for example, quality processing to ensure proper credentials are captured. In further embodiments, various helper networks can be configured to establish liveness of a data capture, for example, based on liveness validation (e.g., submitted identification credential is not a spoofed credential submission), among other options.

FIG. 1 is a block diagram of an authentication system 100. According to various embodiments the authentication system 100 can accept a variety of identification inputs (e.g., 101) and produce filtered identification data (e.g., at 120) for use in identification/enrollment/authentication functions (e.g., 130). For example, the authentication system 100 can be configured to accept various biometric inputs 101A including images of a user's face, 101B including images of a user's fingerprint, 101C including captures of the user's voice, among other options (e.g., as shown by the three dots appearing under the various inputs). Various embodiments can be configured to operate on the various inputs shown, or subsets of those instances. According to some embodiments, the authentication system can be configured with an authentication gateway 102. The authentication gateway may include a plurality of helper networks each tailored to process a respective identification input. For example, a helper network can be tailored specifically to deal with facial recognition images and/or video for identifying a user face. Different types of helper networks can be tailored to specific functions, including, for example, geometry helper networks (e.g., 104) that are configured to identify characteristics within an identification/authentication input and/or positional information within the input that can be used for validation and/or creation of embeddings (e.g., encrypted feature vectors produced by an embedding network—discussed below).

In various embodiments, geometry helper networks can be configured to support analysis by validation helper networks (e.g., 106). Although in other embodiments, validation helper networks are configured to operate on input data without requiring the output or analysis of geometry helper networks. In yet other embodiments, some validation networks can receive information from geometry helper networks while other helper networks operate independently and ultimately deliver an assessment of the validity of an identification/authentication instance. In the context of image inputs, the validation helper network can determine that the submitted image is too blurry, off-center, skewed, taken in poor lighting conditions, among other options, that lead to a determination of a bad instance.

In some embodiments, the various helper networks can include processing helper networks configured to manage inputs that are not readily adaptable to geometric analysis. In some examples, the processing helper networks (e.g., 108) can also be loosely described as geometry helper networks and the two classifications are not mutually exclusive, and are describe herein to facilitate understanding and to illustrate potential applications without limitation. According to one example, processing helper networks can take input audio information and isolate singular voices within the audio sample. In one example, a processing helper network can be configured for voice input segmentation and configured to acquire voice samples of various time windows across an audio input (e.g., multiple samples of 10 ms may be captured from one second to input). The processing helper networks can take audio input and include pulse code modulation transformation (PCM) that down samples the audio time segments to a multiple of the frequency range (e.g., two times the frequency range). In further example, PCM can be coupled with fast fourier transforms to convert the audio signal from the time domain to a frequency domain.

In some embodiments, a series of helper networks can be merged into a singular neural network (e.g., 110) that performs the operations of all the neural networks that have been merged. For example, geometry helper networks can be merged with validation helper networks and the merged network can be configured to provide an output associated with validity of the identification/authentication data input.

Regardless of whether a plurality of helper networks is used or a merged network is used or even combinations thereof, the authentication data gateway 102 produces a set of filtered authentication data (e.g., 120) that has pruned bad authentication instances from the data set. Shown in FIG. 1 is communication of the filtered authentication data 120 for use in identification, enrollment, and/or authentication services at 130. In some embodiments, an authentication system can include components for performing identification of entities, enrollment of users, and components for authenticating enrolled users. Filtered data can be used for any of the example preceding operations. In some examples, filtering of training data can be prioritized, and an authentication system does not need to filter authentication inputs when performing a specific request for authentication against enrolled data. In some other embodiments, an authentication system can provide data gateway operations and pass the filtered data onto other systems that may be used to identify, enroll, and/or authenticate users. Other implementations can provide data gateway operations, identification operations, enrollment operations and/or authentication operations as part of a single system or as part of a distributed system with multiple participants. Some embodiments can used helper network validation or invalidation determinations to request an identification target re-submit identification information, among other options.

In other embodiments, the operation of the helper networks shown can be used in the context of identification. The helper networks are used to ensure valid data capture that can then be used in identifying an individual or entity based on acquired information. Broadly stated, the geometry and/or processing helper networks operate to find identification data in an input, which is communicated to respective validation helper networks to ensure a valid submission has been presented. One example of an identification setting versus an authentication setting, can include airport security and identification of passengers. According to various embodiments, identification is the goal in such example and authentication (e.g., additional functions for role gathering and adjudication) is not necessary once a passenger has been identified. Conversely, the system may be tasked with authenticating a pilot (e.g., identification of the pilot, determining role information for the pilot, and adjudication) when seeking to access a plane or plane flight control systems.

Figure 2:
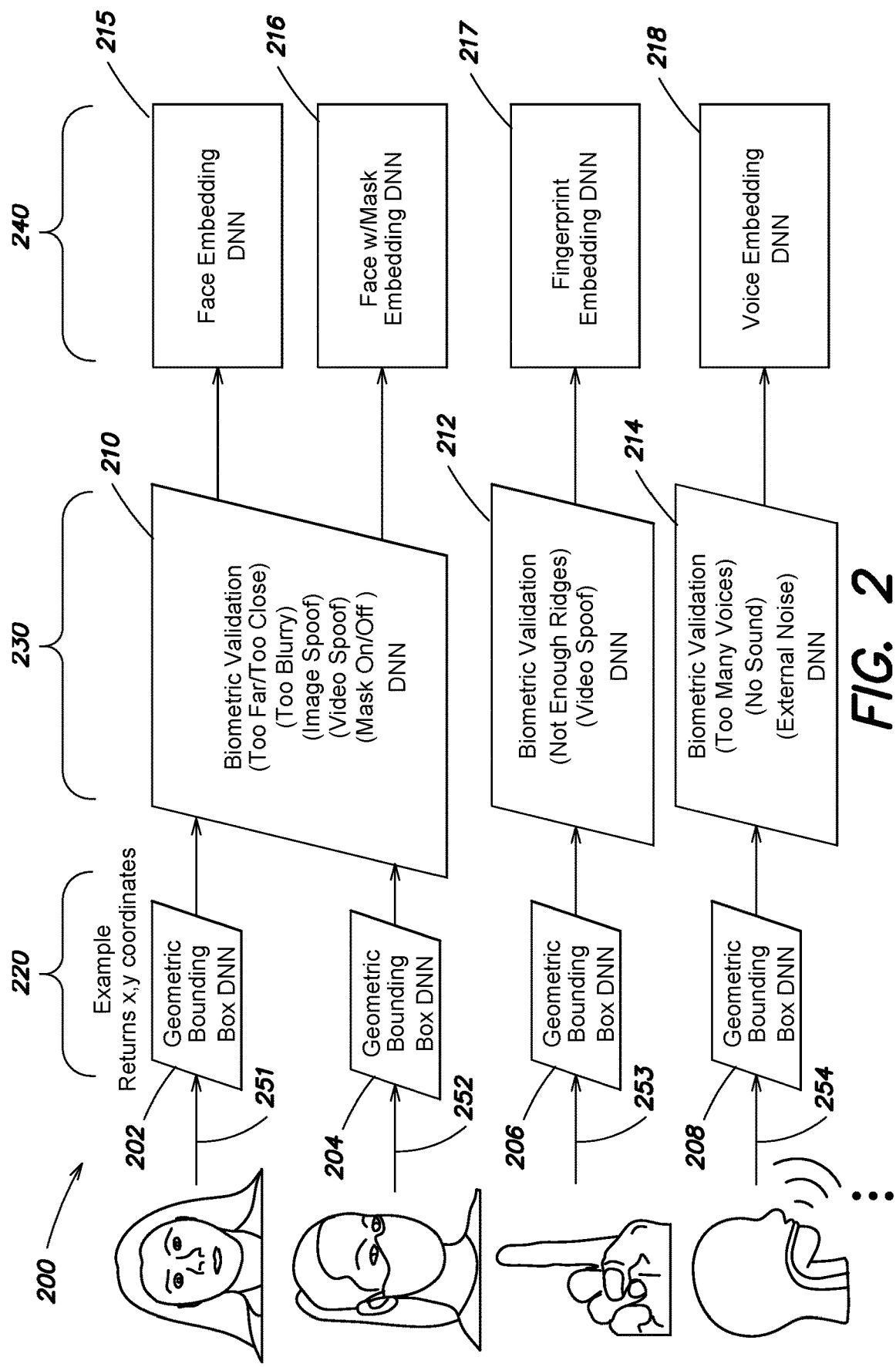
FIG. 2 is a block diagram of examples helper networks for processing respective authentication inputs, according to one embodiment.

FIG. 2 is a block diagram of authentication system 200 executing a variety of example helper networks. The respective helper networks are configured to process (e.g., at 220) respective identification credential input (e.g., biometric input (e.g., 251 face image, 252 face image with mask, 253 fingerprint capture, 254, voice capture, among other input options and corresponding helper networks, shown by three dots)) and filter bad credentials (e.g., at 230) from being used in subsequent recognition tasks, for example, incorporation into embedding generation networks (e.g., at 240). Description of various functions, operations, embedding network architecture, and uses of generated embeddings for identification. authentication and/or for training classification networks, among other examples, are described in co-pending US. application Ser. No. 16/832,014, filed on Mar. 27, 2020, titled "SYSTEMS AND METHODS FOR PRIVACY-ENABLE BIOMETRIC PROCESSING," (the '014 Application) incorporated herein in its entirety.

Various embodiments of an authentication system can be configured to process and filter authentication data using helper networks, where the filtered data is made available for subsequent use by, for example, the embedding networks described in the '014 application. Stated broadly embedding networks can be executed to accept authentication inputs in a plain-text or unencrypted form and transform the input into an encoded representation. In one example, embedding networks are configured to transform an authentication input into a geometrically measurable one-way encoding of an authentication input (e.g., a one way homomorphic encryption). Use of such encodings preserves the secrecy of underlying authentication data, while providing embeddings than can be evaluated/classified in an encoded space. The inventors have realized that improvements in data enrollment using helper networks results in improved accuracy for embedding networks and resulting authentication operations.

Returning to FIG. 2, the respective biometric inputs (e.g., 251-254) are captured and used as input in a processing stage (e.g., 220) configured to confirm or identify relevant or interesting characteristics within the respective biometric input. For example, respective helper networks (e.g., 202-208) are configured to process input biometric information and establish characteristics for analysis based on the input data. In one example, the geometric helper network 202 can be configured to process an input face image and return coordinates for characteristic features within the image (e.g., eyes, nose, mouth, ears, etc.). Another geometric helper network (e.g., 204) can be configured to analyze facial images where the user is wearing a mask. The output of these geometric helper networks can be processed by similar validation helper networks configured to validate (e.g., at 230). Other geometric helper networks include a fingerprint geometric helper networks 206 and a voice helper network 208.

According to one embodiment, the fingerprint helper networks 206 can be configured to align, crop, and/or identify fingerprint characteristics within an image. For example, the helper network 206 can identify position information for ridges and whorls and other characteristics that would be analyzed in a fingerprint image. The outputs of helper network 206 can then be processed by a validation network (e.g., 212) to filter any bad inputs. Likewise, the voice geometric helper network 208 is configured to capture characteristics from an audio sample and communicate processed samples to a validation network (e.g., 214). Processing by the voice geometric helper network can include PCM and fast fourier transformation of audio samples, which are then validated as good or bad samples by, for example, validation network 214.

According to various embodiments, the validation networks are configured to protect the embedding neural networks shown in phase 240. For example, if a poor image is allowed into the embedding network 215 the poor image will disturb the distance measurements on the output of the embedding network and the embedding model 215 itself. Incorporation of bad data can compromise the entire network, which results in false positives and false negatives for subsequent authentications.

Returning to the validation phase (e.g., 230), a plurality of validation networks is configured to determine if an authentication input is valid for use or not. For example, a face validation helper network can be configured to determine if an input image was taken with the camera too far away from the subject or too close to the subject, where either condition is used to identify the bad credential and exclude it from use. In other examples, face validation helper networks can also determine if an image is too blurry, if an image is spoofed (e.g., a photo of a user is presented rather than a capture of the user directly), if video input used for submitting facial information is spoofed rather than presented by the actual user, if the user or subject is wearing a mask or not, among other options.

In various embodiments the validation networks are architected based on a deep neural network model and each can return the probability, score, or value that determines if an input is valid or bad. In further embodiments, the helper network can return state information, including whether a user is wearing a mask or not. In some examples, a determination that a user is wearing a mask may cause an authentication system to exclude the identification information from use, and in other examples, the authentication system can use the state determination, wearing mask, to select a respective embedding DNN (e.g., 216—an embedding network trained on images with users wearing masks).

In further example, an authentication system can include a fingerprint validation helper network (e.g., 212) that is configured to determine if a fingerprint capture includes enough ridges or characteristics to provide good analysis. In addition, fingerprint helper networks can also determine liveness—confirm that spoofed video is not the source of a submission or an image spoof is not the source of submission.

Additional embodiments can include voice validation helper networks configured to determine if too many voices are present in an input, and if no sound is present in an input, if too much external noise is present in an input, among other options.

Once an input is validated the inputs can undergo further processing, including, identification, authentication, enrollment, etc. For example, the input can be processed by a respective embedding network in stage 240. For example, a face embedding DNN 215 can process user face images. In further example, a face with mask embedding network 216 can process images of users wearing masks. Other examples include a fingerprint embedding DNN 217 for processing fingerprint images and voice embedding DNN 218 for processing audio inputs.

In various embodiments, the output of stage 240 is an embedding or feature vector representative of the input but in an encoded form. For example, the embedding networks can generate encrypted feature vectors or other one-way encoded representations that are geometrically measurable for comparison. In one example, an embedding network can accept an unencrypted input and produce encrypted feature vectors that are a homomorphic one-way encryption of the input.

Figure 3:
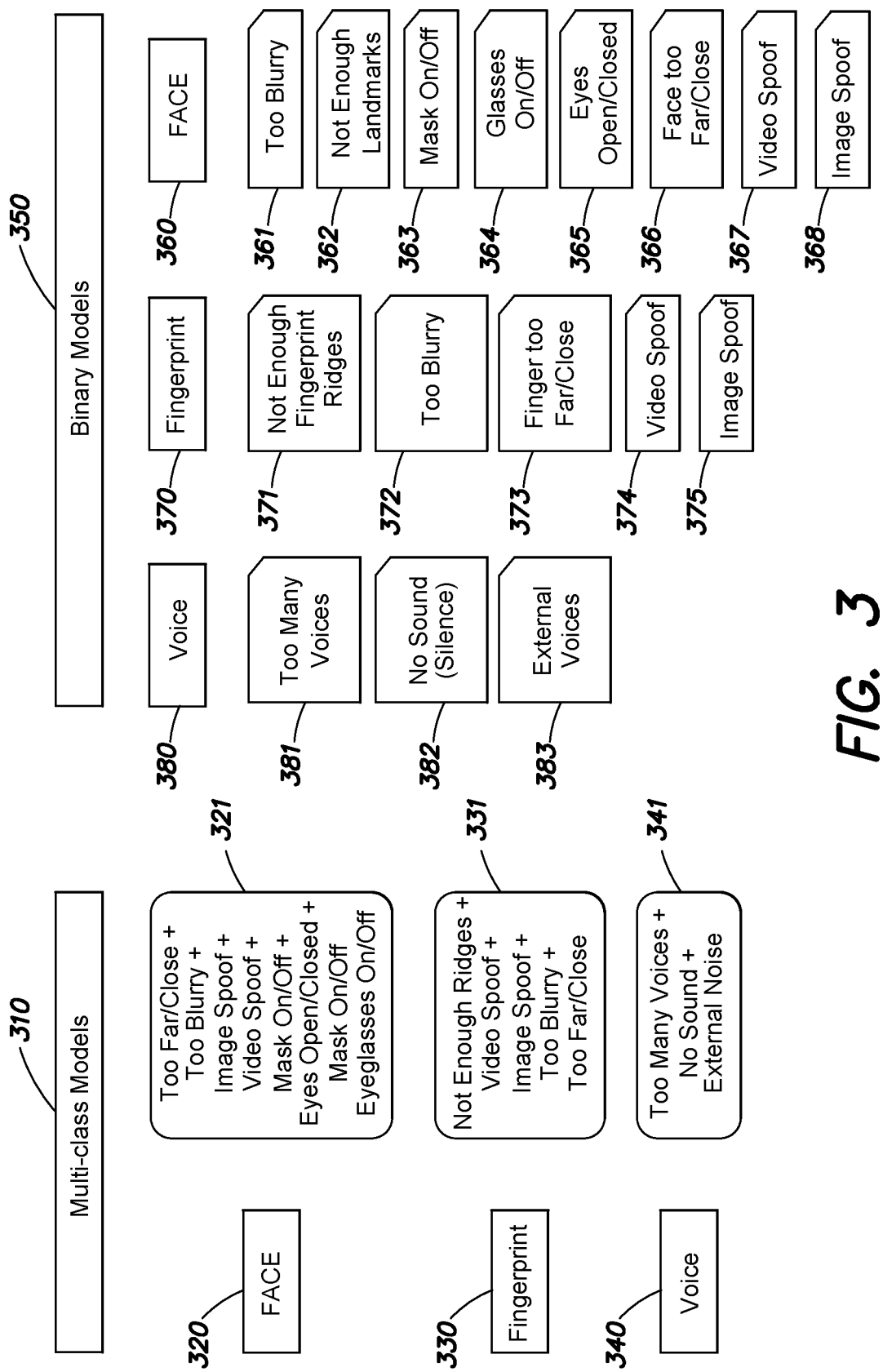
FIG. 3 illustrates example multiclass and binary helper network models, according to some embodiments.

FIG. 3 is a block diagram illustrating various example helper networks, according to various embodiments. According to one embodiment, an authentication system can execute a variety of different helper networks architected on a variety of models. For example, a group of helper networks can be configured to establish one of a pair of states. Stated broadly, the helper networks configured to establish one of a pair of states responsive to input can be referred to as binary models. For example, a respective binary helper network is configured to determine if an input is associated with the first or second state. In an identification or authentication setting, a variety of helper networks can be configured to process images for facial recognition (e.g., 360) using a plurality of binary or other models.

According to some embodiments, face processing helper networks can include evaluations of whether, or not, an image is too blurry to use in the context of identification, authentication, and/or training. In another example, a face helper network can be configured to determine if there are not enough landmarks in an input image for facial recognition or in the alternative if there are enough landmarks (e.g., 362). Further embodiments include any combination of the prior helper networks and may also include helper networks configured to determine if the user is wearing a mask or not, if the user is wearing glasses or not, if the user's eyes are closed or not, if an image of the user was taken too far from or too close to the camera or image source (e.g., see 361-368), among other options.

Other helper networks may be used in conjunction with different embodiments to determine a state of an authentication input which may involve more than binary state conditions. In further embodiments, other authentication modalities can be processed by different helper networks. According to one embodiment, a fingerprint helper network can be configured to accept an image input of a user's fingerprint and process that image to determine if a valid authentication instance has been presented (e.g., 370). For example, the fingerprint validation network can be configured to accept an image input and determine a state output specifying if not enough fingerprint landmarks (e.g., ridges) are present for authentication, or alternatively that enough fingerprint ridges are present (e.g. 371). In another example, a fingerprint validation network can be configured to determine if a fingerprint image is too blurry to use (e.g. 372). In further example, the fingerprint validation network can also be configured to determine if a fingerprint image is too close to the image source that captured it or too far from the image source that captured it (e.g. 373). Similar to face validation, a fingerprint validation network can also be configured to identify submissions that are spoofed video (e.g. 374), or spoofed images (e.g. 375).

According to some embodiments, validation models can be configured to score an authentication input and based on evaluation of the score a respective state can be determined. For example, a validation helper network can produce a probability score as an output. Scores above the threshold can be classified as being one state with scores below the threshold being another. In some examples, intermediate values or probability scores can be excluded or assigned an inconclusive state.

Further embodiments are configured to execute helper networks to process additional authentication modalities. According to one embodiment, an authentication system can include voice validation helper networks (e.g. 380) configured to accept an audio input and output of probability of validity. In one example, a voice helper network is configured to determine if too many voices are present in a sample (e.g., 381). In another example, a voice validation network can be configured to determine if no sound is present in an audio sample (e.g. 382). Further examples include voice validation networks configured to determine if too much external noise is present in an audio sample for proper validation (e.g., 383).

According to some embodiments, audio spoof detection can use an induced audio signal. Such an induced audio signal can be an audible tone or frequency and may also include a signal outside human hearing. Various patterns and/or randomized sounds can be triggered to aid in presentation attack detection. Various validation networks can be configured to identify the induced audio signal as part of authentication input collection to confirm live authentication input.

Shown at 310 are examples of multiclass models that can be based on combinations and/or collections of various binary or other state models. For example, a face validation model can incorporate a variety of operations to output a collective determination on validity based on the underlying state determinations. In one example, the face validation network (e.g., 320) can analyze an image of a user face to determine if any of the following characteristics make the image a bad authentication input: image is too far or too close, image is too blurry, image is spoofed, video spoof produced the input, the user is wearing a mask, the user's eyes are open or closed, the user is or is not wearing eyeglasses, etc. (e.g., 321). In other embodiments, any combination of the foregoing conditions can be tested and as few as two of the foregoing options can be tested to determine the validity. In still other embodiments, different numbers of conditions can be used to determine if an authentication input is valid.

According to other embodiments, different multiclass models can be applied to different authentication inputs. For example, at 330 shown is a fingerprint validation model that can test a number of conditions to determine validity. In one example, a fingerprint validation network (e.g. 331) is configured to test if enough ridges are present, if the input is a video spoof, if the input is an image spoof, if the image is too blurry, and if the image was captured too far or too close to an image source, among other options.

According to one embodiment, a voice validation network (e.g., 340) is configured to validate an audio input as a good authentication instance. In another example, the voice validation network can be configured to determine if there are too many voices present, no sound present, if too much external noise is present in an audio input, among other options (e.g., 341). In addition, the voice validation network can also include operations to determine liveness. In one example, an authentication system can induce an audio tone, sound, or frequency that should be detected by a validation network in order to determine that an authentication input is live and not spoofed. Certain time sequences or patterns may be induced, as well as random audio sequences and/or patterns.

Figure 4:
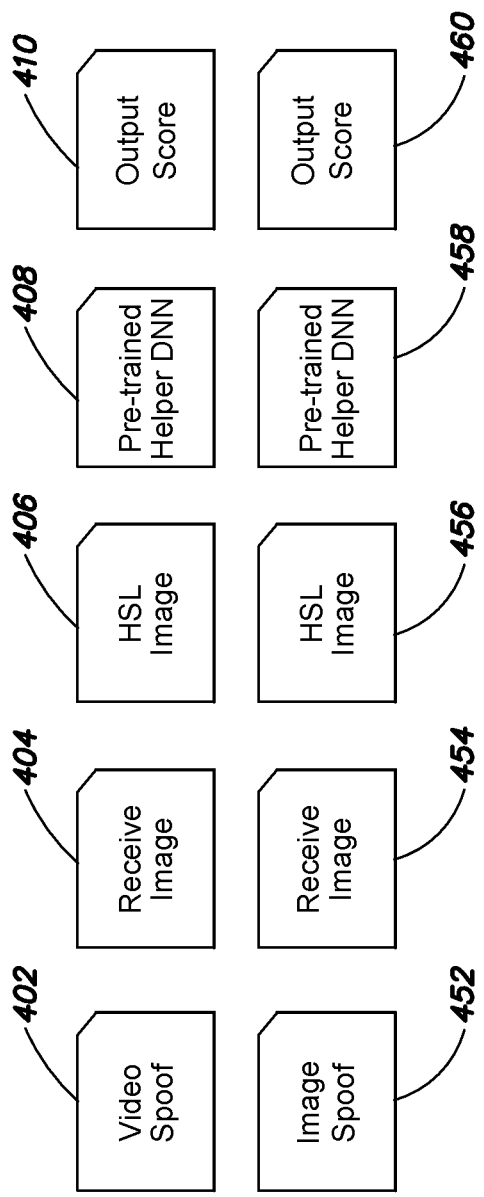
FIG. 4 illustrates example processing for detecting presentation attacks, according to some embodiments.

FIG. 4 is a block diagram illustrating operations performed by validation helper networks configured to determine liveness. FIG. 4 illustrates various considerations for implementing validation networks to detect input spoofing according to some embodiments. The illustrated examples of helper networks (e.g. 408, 458) are trained by creating a multitude of input spoofed images that are created in a variety of lighting conditions and backgrounds. The spoofed images are received at 454, and the spoofed images are transformed into augmented image format that limits lighting effects, and limits the effects of subject skin color, and facial contour. The augmented image format can include for example an HSL image format. Various considerations for color harmonization are discussed in, "Color Harmonization," by D. Cohen-Or et al., published 2006 by Association for Computing Machinery, Inc. Other augmentation/homogenization formats could be used including, for example, LAB color space or contrast limited adaptive histogram equalization "CLAHE" method for light normalization.

Once a variety of spoofed images are produced and the lighting conditions normalized, various additional spoofed instances can be created with multiple alignments, cropping's, zooms (e.g., in and out) to have a body of approximately two million approved images. The validation network is trained on the images and its determinations tested. After each training, false positives and false negatives remain in the training set. In some example executions, the initial two million images are reduced to about 100,000. The validation network is retrained on the remaining samples. In further embodiments, retraining can be executed repeatedly until no false positives or false negatives remain. A similar training process can be used in the context of video spoofed video inputs. A video liveness validation network can be trained similarly on false positives and false negatives until the network identifies all valid inputs without false positives or false negatives.

Once trained, processing follows a similar approach with any authentication input. Shown are two pathways one for video spoof inputs and one for image spoof inputs (e.g. 402 and 452 respectively). The spoofed data is received as 404/454 and the data is transformed into the HSL format at 406/456, which is processed by respective validation networks (e.g. 408/458—which can be, for example, pre-trained helper validation deep neural networks). In response to the input of potentially spoofed authentication data, the validation networks 408/458 output respective scores 410/460, and based on the respective scores an authentication system can determine if an authentication input is valid or simply a replay or spoof of a valid authentication input.

Unlike some conventional systems that can use machine learning approaches to cluster images before processing, the validation networks are trained on universal characteristics that apply to all authentication inputs, and each determination of validity establishes that a singular authentication instance is valid or not. In various embodiments, the validation network is trained on characteristics within the data set that are independent of the subject to identified, authentication, and/or enrolled. With the training as described above, various embodiments provide helper networks that are capable of presentation attack detection (e.g., spoofed submission of a valid image). Clustering of similar images, as done in some conventional approaches, is not expected to solve this issue, and the likely result of such an approach would include introduction of spoofed images into such clusters, which ultimately will result in incorporation into and successful attacks on resulting authentication models.

Figure 5:
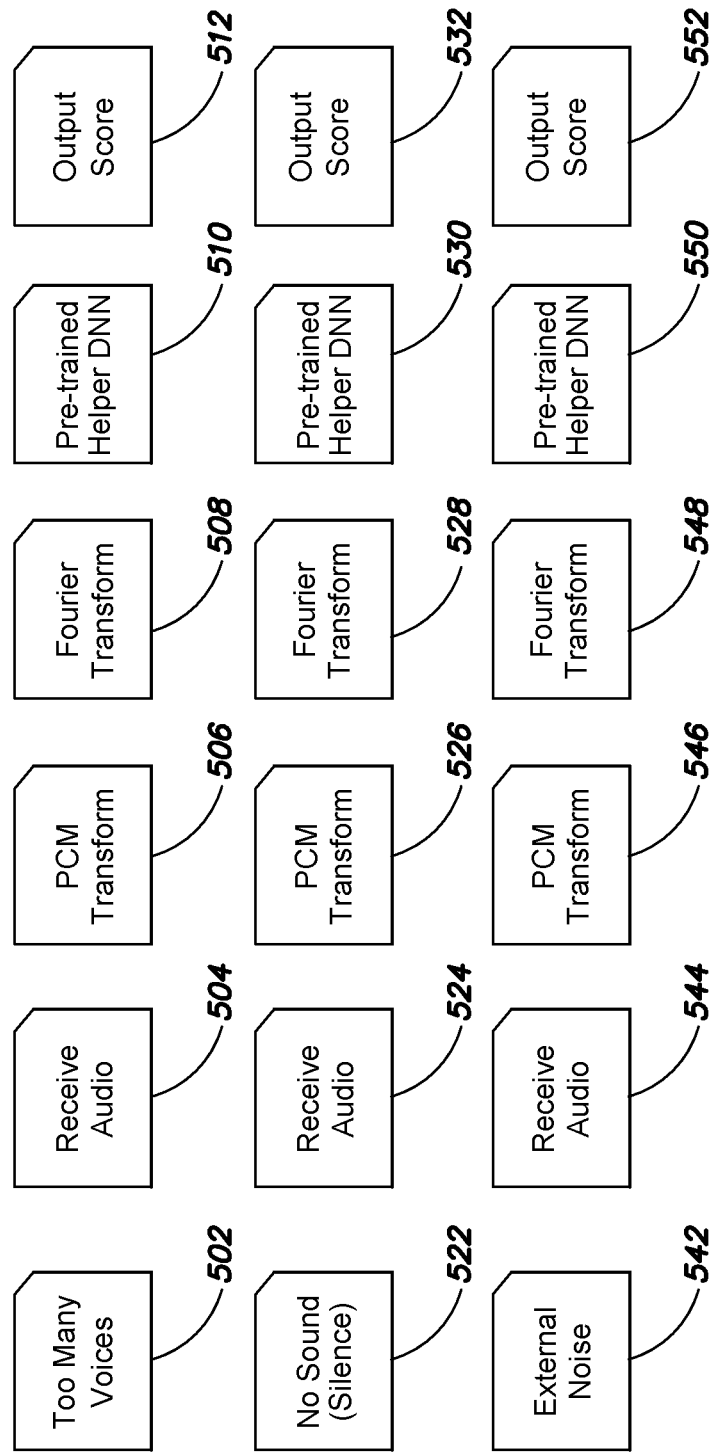
FIG. 5 illustrates example process flow for voice processing, according to some embodiments.

Shown in FIG. 5 are various embodiments of helper networks configured to analyze voice input and determine if a valid authentication input has been submitted. According to some embodiments, voice helper networks can be configured to determine if too many voices are present in an authentication instance, if no sound is present, and/or if external noise is too loud, among other options to validate that a good authentication instance has been provided. Various sets of training data can be used to train respective voice helper networks (e.g., voice training data with multiple voices, training data with no voice data, training data with external noise, etc.).

According to one embodiment, voice validation helper networks are trained to identify various states to determine if an authentication instance is valid for use in authentication. The helper networks can be trained on various audio inputs. In one example, a body of audio inputs are captured that are clean and valid (e.g., capture of known valid users' voices). The initial audio data is mixed and/or modified with external noises that impact how good they are in terms of authentication sources. For example, to determine impact of the noise, an output of a voice embedding network can be used to evaluate a cosine distance between various audio inputs. Where the introduction of external noise impacts the cosine distance evaluation, those instances are useful in establishing a training data set for identifying valid/invalid audio instances.

According to one embodiment, a set of 500 clean samples are captured and used to mix with external noises (e.g., 500 external noises evaluated for impact on cosine distance). The 500 initial samples are expanded and mixed with external voices until a large number of audio samples are available for training. In one example, helper networks can be trained on over eight million audio samples. Once trained, the results produced by the helper networks are tested to determine how well the helper networks identified valid data. False-positive results and false negative results are then used for subsequent training operations. According to one embodiment, millions of samples can be reduced to hundreds of thousands of false positives and false negatives. In various example executions, human perception is incapable of determining a difference between the spoofed audio and a valid instance once the training data has been reduced to the level of ~100K instances, however, the trained model is able to distinguish between such audio samples.

In some implementations, false positives and false negatives are used repeatedly to train the model until the model is able to execute with no false positives or false negatives. Once that result is achieved or substantially close to that result (e.g. less than 1-5% false-positive/false-negative exists) the voice validation model is trained and ready for use. According to one example, an authentication system can use any number of voice validation helper networks that are pre-trained to detect spoofed audio instances.

Returning to FIG. 5, three example pre-trained voice helper networks (e.g., DNNs) are illustrated. In the first block illustrated each helper network is configured to detect a state—at 502 too many voices, at 522 no sound is present, and/or at 542 too much external noise. The respective helper networks receive audio for processing (e.g. 504, 524, 544). According to various embodiments, PCM is executed on received audio (e.g., 506, 526, 546). The result is transformed into the frequency domain (e.g. 508, 528, 548—fourier transform). The respective outputs are evaluated by pre-trained helper DNNs at 510, 530, and 550. The respective helper networks are configured to output scores associated with their state evaluation. For example, the respective networks output scores at 512, 532, and 552. The scores can be used to determine if the audio input is valid for use in authentication. For example, the output value can reflect a probability an instance is valid or invalid. In one implementation, values above a threshold are deemed invalid and vice versa. In further example, some ranges for probable matching can be determined to be inconclusive.

According to some embodiments, the various states described above (e.g., too many voices, no sound, external noise issues, among other options) can be tested via a merged network that incorporates the illustrated pre-trained helper networks into a single neural network, and the output represents a collective evaluation of validity of an audio input.

Figure 6:
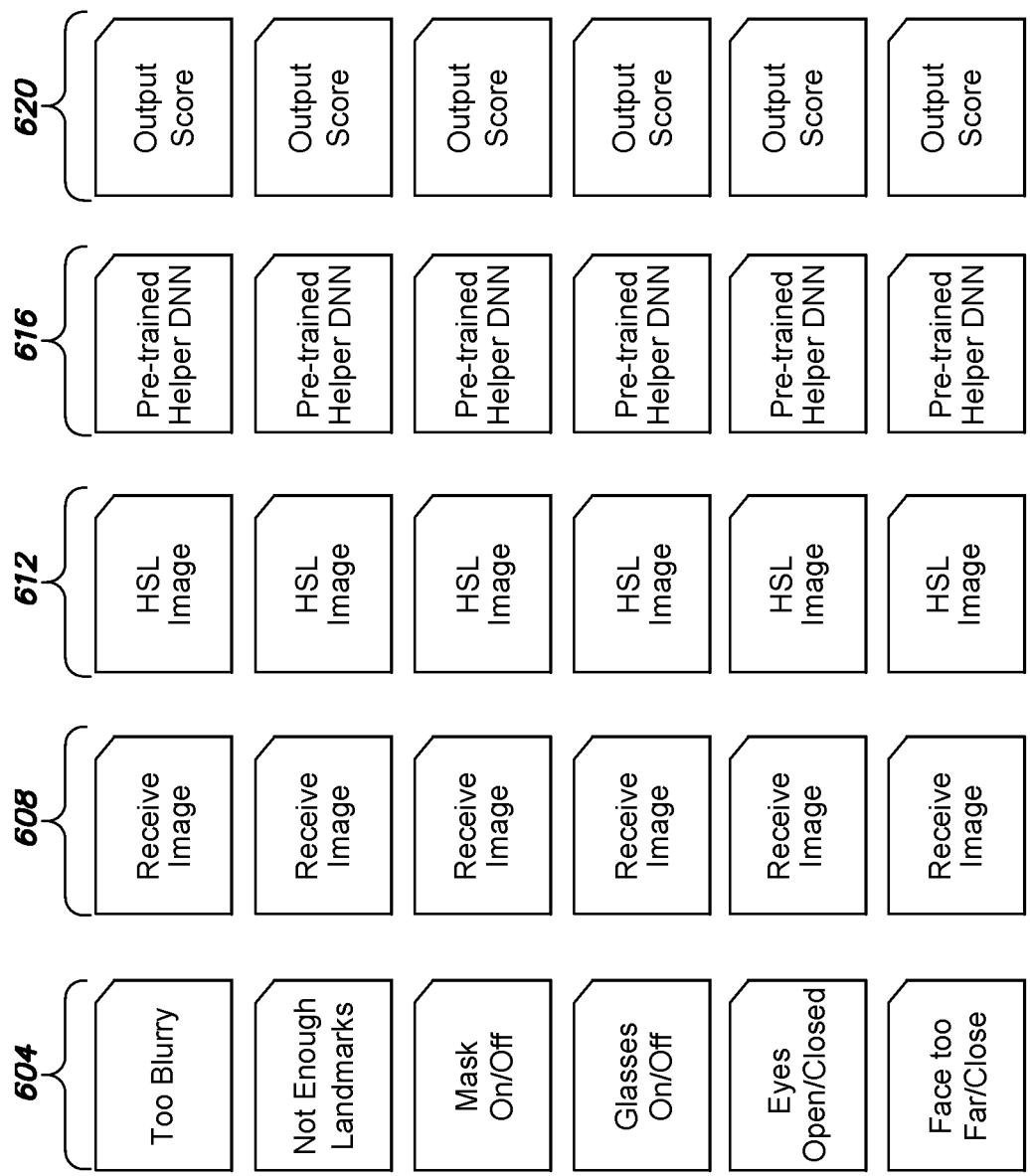
FIG. 6 illustrates example process flow for facial image processing, according to some embodiments.

FIG. 6 illustrates a variety of helper networks configured to evaluate facial images and output a scoring for determining validity. In the first column shown in FIG. 6, the state being tested is specified. For example, at 604 some of the states that respective helper networks can test are illustrated. Various embodiments include tests for whether an image is too blurry, does not contain enough landmarks, images a user with a mask on or off, images a user with glasses on or off, images the user with eyes closed or open, an imaged face is too far or too close to an image source or camera, etc. According to some embodiments, processing by the helper networks proceeds at column 608 where the respective helper networks receive image data that is processed into normalized image data at 612 (e.g., processed into an HSL image). At column 616, the respective helper networks evaluate respective HSL images and at column 620 output a score used to determine validity based on the evaluated state specified in column 604.

According to various embodiments face validation helper networks are trained based on an initial set of valid input images which are taken in a variety of lighting conditions and background so that each lighting condition has multiple backgrounds and each background has multiple lighting conditions. A large training set is beneficial according to some embodiments. In some examples 500,000 images can be used to establish the variety of lighting conditions and backgrounds. The initial set of images can then be normalized to produce HSL images. Other processes can be used to normalize the training set of images. The resulting images are manipulated to generate an expanded set of training images. For example, a variety of alignments and/or cropping of the images can be executed. In other examples, and in addition or in the alternative, a variety of zoom operations (e.g., in and out) can be applied to the images. As part of expanding the training set, the images can be integrated with defects, including, adding bad lighting, occlusions, simulating light beams over a facial image, eliminating landmarks on faces present, having images that are too far and too close to an image source and or introducing blurring into the training images, among other options. The initial body of training images can be expanded significantly and for example, a set of 500,000 images can be expanded into 2 million images for a training set.

Once the training set is prepared, the helper network is trained against the data to recognized valid authentication inputs. The results produced by the helper network are evaluated. Based on the results evaluation, any false positives and any false negatives are used for further training of the model. According to one example execution, about one hundred thousand images remain that are false-positives or false-negatives after the first attempt. Training can be repeated until no new false-positive or false-negative remain, using the remaining false results to retrain. In other examples once a sufficient level of accuracy is achieved greater than 95% training can be considered complete. According to some embodiments, facial validation helper networks are architected on a deep neural network model that can identify any of a number of states associated with a facial image, and further can be used to determine if the image is valid for use in authentication.

Figure 7:
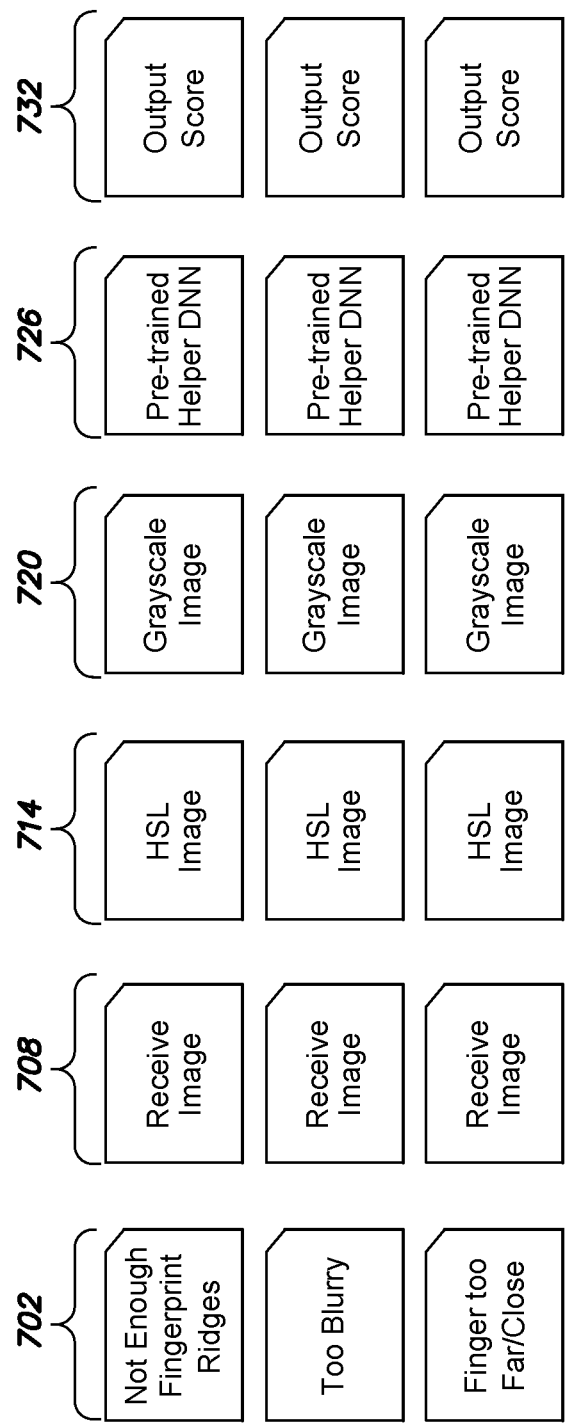
FIG. 7 illustrates example process flow for fingerprint processing, according to some embodiments.

Shown in FIG. 7 is a similar approach for executing helper networks on fingerprint images, according to some embodiments. In the first column at 702, specified is a state being tested by a respective helper network. For example, a validation helper network can determine if not enough fingerprint ridges are available, if an image is too blurry, is a fingerprint image is too far or too close to an image source, among other options. At column 708, image data is received, and at column 714, the received image data is transformed into HSL image format. The HSL image is reduced to a grayscale image at column 720. The result is analyzed by respective helper networks (e.g., input to pre-trained helper DNNs) at 726. Once analyzed, the respective networks output a score used to determine validity of the authentication instance (e.g., at column 732).

Similar to the approach discussed with respect to FIG. 6, fingerprint image data can be captured in multiple lighting conditions and with multiple backgrounds to produce training data sets used to define the helper network models. Once a body of images is produced, the images are transformed into HSL images and then into grayscale. A variety of alignments, crops, zooms (e.g. in and out), are applied to the body of images. In addition, operations are executed to various ones of the body of training images to introduce defects. For example, bad lighting conditions can be added, as well as occlusions, introduction of light beams into images, removal of landmarks from the image, as well as using images where the fingerprint image is too far and/or too close to an image source. Other example images can include blurry fingerprint captures or introduction of blur into training data images. According to some embodiments, an initial body of 500,000 images can be expanded into a body of 2 million images to train the model.

According to one embodiment, once the expanded set of images is created a helper network model can be trained on the body of images to identify valid authentication inputs. Initially the output determination of the helper network yields false positives and false negatives. Any resulting false-positives and false negatives are used to continue training of the helper network. In one example execution, an initial set of two million images yields approximately 100,000 false-positives and/or false negatives when the helper networks results are evaluated. The helper network model is retrained based on the remaining images and tested to identify any further false-positives and/or false negatives. The approach can be repeated to refine the model until no false positives or false negatives are identified. In other embodiments, an authentication system can use a threshold level of accuracy to determine a model is fully trained for use (e.g. greater than 90% accuracy, greater than 95% accuracy, among other options).

Once respective helper networks are trained on their expanded data sets and iterated until no false positives or false negatives are output, an authentication system can execute the pre-trained helper network to determine the validity of any authentication input and filter bad inputs from use in training authentication models (e.g., embedding generation networks).

Further helper network embodiments include a transcription helper network. For example, some embodiments include one or more helper networks configured to accept an audio input and evaluate where the audio sample is of suitable quality to use in subsequent processing. In some examples, subsequent processing includes identification and/or authentication settings. In other examples, the transcription helper network (and any helper network described can be used in other subsequent processing. In one example, the transcription helper network is configured to evaluate input audio and generate a determination that the audio sample is of suitable quality to forward for a voice transcription.

In some embodiments, the transcription network can be trained as described with respect to the audio and/or voice networks herein. In further example, the transcription can be trained to identify transcribable audio by defining a training set of good audio and bad audio. Training can be iterative as described herein. For example, bad data and false positives can be used to iteratively train a transcription helper network until no further result are left. The resulting network can then be used on any new audio input to evaluate whether the input is transcribable. In some settings, an indication that the audio input is not transcribable can end the analysis.

Further embodiments can include a helper network trained to verify presence or a target. For example, similar in effect as a captcha check, the helper network can work on its own to identify the presence of a human being or other entity. In some embodiments, the presence verification can be configured to operate without a requirement for determining identity, and can provide a determination on if a face is a human face. Further examples of the presence network can also determine if the information submitter is "live"—not an image or video spoof In still other examples, the helper networks can be configured to determined liveness in the context of a submitter who is wearing a face mask (e.g., face+mask network), a submitter who is wearing a human facsimile mask, and in the context of fingerprint submission. For example, a fingerprint validation network can be trained on a variety of valid fingerprint submissions inputs and a variety of invalid input submissions. Various approaches for generating invalid face submission instances are described herein and can be extended to the fingerprint instance.

According to various embodiments, helper network can be configured to provide a CAPTCHA type service. For example, ones or combinations of helper networks can be used to verify a human subject is seeking identification, authentication, verification, etc. In further embodiments, one or more helper networks can be executed for detecting and differentiating input provided by a human or machine. In an example environment, the system and associated helper networks can be used primarily in Internet applications for verifying that data originating from a source is from a human, and not from an unauthorized computer program/software agent/robot. The following helper network can be used alone and/or in any combination to identify human versus computer actors:

1. Camera input analysis networks: determines valid identification input (e.g., biometric of user's face (therefore is not a robot))
   a. Video spoofing DNN—protects against video presentation attack (PAD)
   b. Image spoofing DNN—protects against image presentation attack (PAD)
   c. Geometry DNN (finds valid face input (e.g., face biometric) in image)
   d. Blurry image DNN (makes sure face input in image is not too blurry)
2. Microphone Input analysis networks: determines valid biometric of user's voice (therefore is not a robot)
   a. Voice spoofing DNN—protects against deepfake or recorded audio attack
   b. Validation DNN—finds valid human voice
   c. Random sentence (optional)—displays a random sentence, then uses automatic speech recognition (ASR) DNN to convert speech to text to ensure the human said the requested words.

Various embodiments for captcha operation relate to electronic systems for detecting and differentiating input provided by humans and machines. These systems are used primarily in Internet applications for verifying that data originating from a source is from a human, and not from an unauthorized computer program/software agent/robot. According to one embodiment, a method of validating a source of image data input to a computing system is provided. The method comprises: receiving one or more images, processing the images using helper networks to ascertain the validity, and generating a determination of whether the face images originated from a machine or a human. A second embodiment concerns a method of validating a source of audio data input to a computing system comprising: receiving speech utterance from a microphone that (optionally) read out loud a randomly selected challenge text; processing the speech audio with helper networks to ascertain the validity, and generating a determination of whether the audio images originated from a machine or a human.

Further embodiments can include a step of: granting or denying access to data and/or a data processing device based on the results of the CAPTCHA like function, including a signup for an email account or a blog posting. For others the step of granting or denying access to an advertisement based on the determination is performed. Other embodiments perform a separate automated visual challenge test so that both visual processing and articulation processing is considered in one or more of the determinations.

The access is preferably used for one or more of the following processing contexts: a) establishing an online account; and/or b) accessing an online account; and/or c) establishing a universal online ID; and/or d) accessing a universal online ID; and/or e) sending email; and/or f) accessing email; and/or g) posting on a message board; and/or h) posting on a web log; and/or i) posting on a social network site page; j) buying or selling on an auction site; and/or k) posting a recommendation for an item/service; and/or l) selecting an electronic ad.

In some embodiments, the various helper networks described are intended to operate independently of other processing and/or functions. For example, the helper networks can be configured to determine if face information or fingerprint information is suitable for continued processing. In an identification/authentication context, the attempt to identify and/or authenticate may terminate upon identification of an unsuitable input (e.g., bad collection, spoof, etc.). In other processing contexts, the helper network can also stop subsequent processing or require resubmission.

Other embodiments can include one or more stand-alone helper network functionality and/or integrate the one or more helper networks into a processing flow.

In other embodiments, helper networks embodiment can be configured to determine if a person (e.g. a doctor entering a hospital) is wearing a mask or wearing a mask in the correct way. In some settings, the helper network and its determination can be used to prevent or allow entry (which can also be coupled with identity and/or authentication protocols). For example, the system can be connected to a physical controller that is configured to only allow entry if a mask is on and/or being worn properly. In various embodiments, the mask helper network is configured to validate a state of mask on/off, and can also be configured to validate a state mask worn properly or not irrespective of a subject to be identified.

In further embodiments, a helper network can be trained on location information and validate that a current geolocation of a requesting device is not blacklisted. In some examples, the location helper networks are trained on location information inputs that are known to be valid as well and location information inputs that are known to be invalid (e.g., as described herein with respect to various helper networks). The trained network can then validate location information captured at the time of an identification function request.

Still other embodiments can include helper networks that validate accelerometer information captured from a device (e.g., a device requesting an identification function, a device associated with an identification function request, etc.).

Helper networks can be trained on accelerometer information that reflects valid position information (e.g., normal or range of angles for known valid requests) and/or invalid position information (e.g., angles or ranges of angles for invalid requests). In one example, a helper network is configured to access and process accelerometer information to determine the user's angle (holding the phone), which can be used by the system to assert/validate liveness and/or identity. Further embodiments can include helper network trained on and configured to validate temperature information to ensure the user/device is where the user/device asserts they are. It is implicit in such location assertions, for example, is that it will not be 0 degrees in California during the summer. Various embodiments are configured to employ weather for helping with the determination of validity. As discussed with respect to various examples, validity determinations can be made independent of a subject to be identified and various helper networks are configured to validate submitted data before it is used for identification functions.

Figure 8:
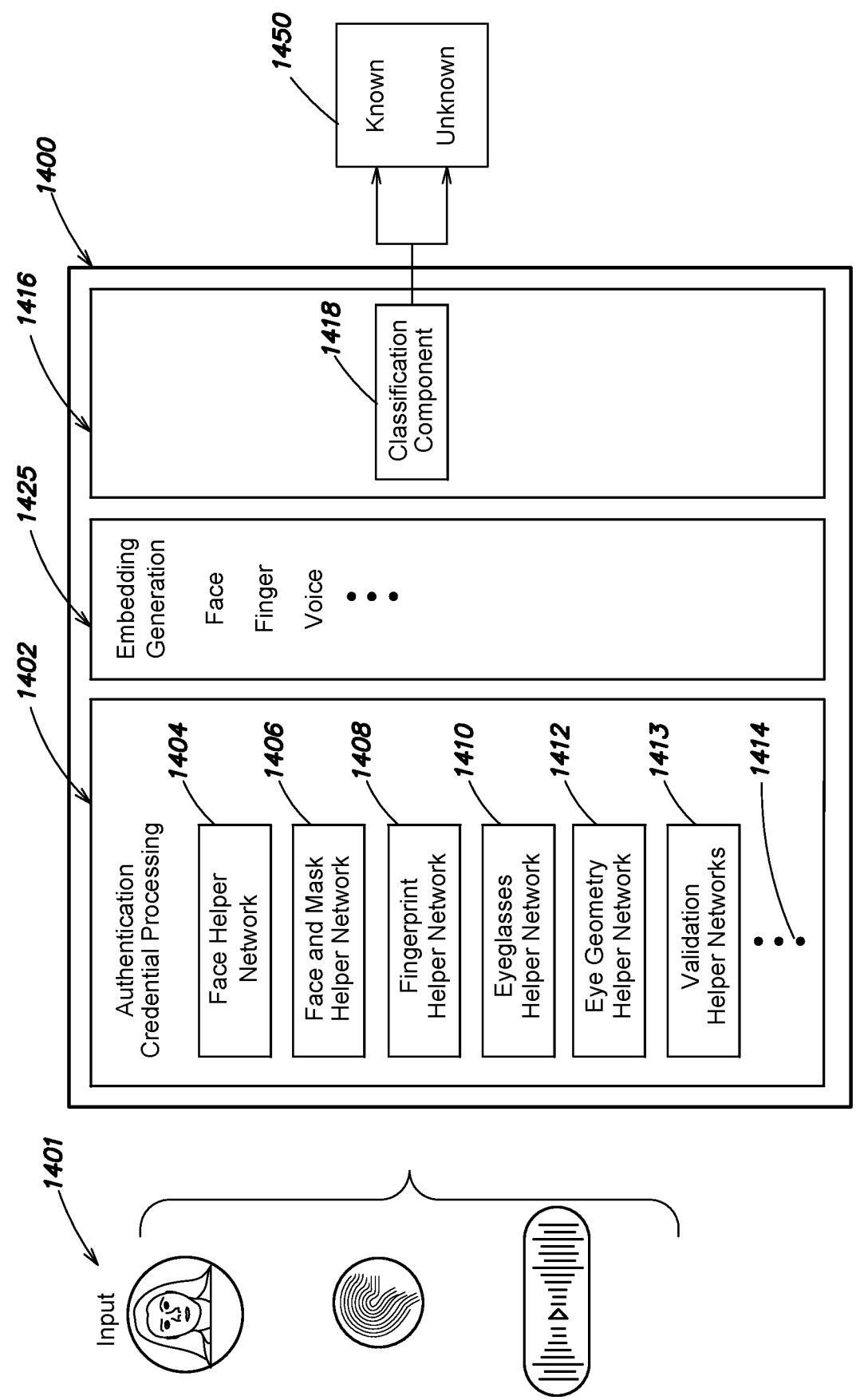
FIG. 8 is a block diagram of an example authentication system, according to one embodiment.

According to one embodiment, liveness helper networks can be trained on and configured to test if a person is live (not a spoof) using a microphone. The system can employ a spoken random liveness sentence to make sure the person making the request is active (alive). If the user's spoken words match the requested words (above a predetermined threshold), the system can then establish a liveness dimension. FIG. 8 is a block diagram of an example embodiment of an authentication system 1400 employing private biometrics with supporting helper networks. As shown in FIG. 8 the system can be configured to accept various authentication credentials in plain text or unencrypted form (e.g., 1401) processes the unencrypted authentication credentials (e.g., via an authentication credential processing component 1402), to ensure the input is valid and good for authentication. For example, a plurality of helper networks can process authentication input to determine validity before they a processed by embedding neural networks (e.g., 1425) into one-way homomorphic representations of the same, wherein the one-way homomorphic representations can be analyzed by a classification component (e.g., 1418) to determine if submitted credentials matched enrolled credentials (e.g., return known for match or unknown at 1450), for example, with a neural network trained on encrypted feature vectors produced by the embedding networks. Evaluations of matches can be validated for example, with a validation component 1420 that is configured to provide validation function once matches or unknown results are determined. In further embodiments, the classification component can operate by itself and in others as a part of a classification subsystem 1416 that can also include various validation functions to confirm matches or unknown results.

Various embodiments include architectures that separate authentication credential processing (e.g., 1402) from operations of the classification subsystem (e.g., 1416), and other embodiments can provide either or both operations as a service-based architecture for authentication on private encryptions of authentication credentials.

The various functions, processes, and/or algorithms that can be executed by the authentication credential processing component 1402 are discussed throughout, and the various functions, processes, and/or algorithms that can be executed by the classification subsystem 1416 are also described with respect to the '014 Application. FIG. 8 is included to provide some examples of helper networks and support functionality and/or algorithms that can be incorporated in the various examples, embodiments, and aspects disclosed herein. The following descriptions focus on the helper network functions to provide illustration, but are not limited to the examples discussed with FIG. 8.

For example, credential processing can include various helper networks (e.g., face 1404, face and mask 1406, fingerprint 1408, eyeglasses 1410, eye geometry 1412, and the " . . . " at 1414, and the preceding networks can each be associated with a validation network configured to determine the validity of the submitted/processed authentication instance. In some examples, geometry or processing networks (e.g., 1404 & 1408) are configured to identify relevant characteristics in respective authentication input (e.g., position of eyes in a face image, position of ridges in a fingerprint image respectively, etc.). The output of such networks is then validated by a validation network trained on that type of authentication input. The " . . . " at 1414 illustrates the option of including additional helper networks, and/or processing functions, where any number or combination of helper network can be used in any combination with various embodiments disclosed herein.

According to some embodiments, the helper networks can be based on similar neural network architectures, including, for example, Tensorflow models that are lightweight in size and processing requirements. In further examples, the helper networks can be configured to execute as part of a web-based client that incorporates pre-trained neural networks to acquire, validate, align, reduce noise, transform, test, and once validated to communicate validated data to embedding networks to produce, for example, one-way encrypted input authentication credentials. Unlike many conventional approaches, the lightweight helper networks can be universally employed by conventional browsers without expensive hardware or on-device training. In further example, the helper networks are configured to operate with millisecond response time on commercially available processing power. This is in contrast to many conventional approaches that require specialized hardware and/or on-device training, and still that fail to provide millisecond response time.

According to some embodiments, various helper networks can be based on deep neural network architectures, and in further examples, can employ you only look once ("YOLO") architectures. In further embodiments, the helper networks are configured to be sized in the range of 10 kB to 100 kB, and are configured to process authentication credentials in <10 ms with accuracies >99%. The data footprint of these helper network demonstrates improved capability over a variety of systems that provide authentication based on complex, bulky, and size intensive neural network architectures.

According to one aspect, each authentication credential modality requires an associated helper DNN—for example, for each biometric type one or more tailored helper networks can be instantiated to handle that biometric type. In one example, a face helper network and a fingerprint helper network (e.g., 1404 and 1408) can be configured to identify specific landmarks, boundaries, and/or other features appearing in input authentication credentials (e.g., face and fingerprint images respectively). Additional helper networks can include face and fingerprint validation models configured to determine that the submitted authentication credential is valid. Testing for validity can include determining that a submitted authentication credential is a good training data instance. In various embodiments, trained validation models are tailored during training so that validated outputs improve the entropy of the training data set, either expanding the circumstances in which trained models will authenticate correctly or refining the trained model to better distinguish between authentication classes and/or unknown results. In one example, distances metrics can be used to evaluate outputs of an embedding model. For example, valid instances improve the distance measure between dissimilar instances as well as to identify similar instances, and the validity networks can be trained to achieve this property.

In the context of image data, a validation helper network can identify if appropriate lighting and clarity is present. Other helper networks can provide processing of image data prior to validation, for example, to support crop and align functions performed on the authentication credentials prior to communication to embedding network for transforming them into one-way encryptions.

Other options include: helper networks configured to determine if an input credential includes an eyes open/eyes closed state—which can be used for passive liveness in face recognition settings, among other options; helper networks configured to determine an eyeglasses on or eyeglasses off state within an input credential. The difference in eyeglass state can be used by the system to prevent false negatives in face recognition. Further options include data augmentation helper networks for various authentication credential modalities that are configured to increase the entropy of the enrollment set, for example, based on increasing the volume and robustness of the training data set.

In the voice biometric acquisition space, helper networks (e.g., helper DNNs) can be configured to isolate singular voices, and voice geometry voice helper networks can be trained to isolate single voices in audio data. In another example, helper network processing can include voice input segmentation to acquire voice samples using a sliding time (e.g., 10 ms) window across, for example, one second of input. In some embodiments, processing of voice data includes pulse code modulation transformation that down samples each time segment to 2× the frequency range, which may be coupled with voice fast fourier transforms to convert the signal from the time domain to the frequency domain.

Various embodiments can use any one or more and/or any combination of the following helper networks and/or associated functions. In one embodiment, the system can include a helper network that includes a face geometry detection DNN. The face geometry DNN can be configured to support locating face(s) and associated characteristics in an image by transforming each image into geometric primitives and measuring the relative position, width, and other parameters of eyes, mouth(s), nose(s), and chin(s).

Facial recognition functions can be similar to fingerprint recognition functions executed by fingerprint helper networks as both networks process similar modalities (e.g., image data and identification of structures within the images data to build an authentication representation). According to one embodiment, a helper network can include a fingerprint geometry detection DNN configured to accurately locate finger(s) in an image, and analysis can include transforming each image into geometric primitives to measure each finger's relative position, width, and other parameters. In one example, helper networks that process image data can be configured to identify relevant structures in the image and return positional information in the image (e.g., X and Y coordinates), video frame, and/or video stream submitted for processing of the relevant structures. In one example, geometry networks process image credentials and their output can be used in validating the authentication instance or rejecting the instance as invalid.

In another embodiment, a helper network can include a face validation DNN configured validate face input images (e.g., front looking face images). In various embodiments, the validation DNN is configured to validate any one or more or any combination of the following: a valid image input image was received, the submitted image data has forward facing face images, the image includes features consistent with a facial image (e.g., facial characteristics are present, and/or present in sufficient volume, etc.); lighting is sufficient; boundaries within image are consistent with facial images, etc.

Similarly, a helper network can include a fingerprint validation DNN configured to validate fingerprint input images. Such validation networks can be configured to return a validation score used to determine if an image is valid for further processing. In one example, the validation networks can return a score in the range between 0 to 100, where 100 is a perfect image, although other scoring systems and/or ranges can be used.

In further embodiments, a helper network can include one or more image state detection neural networks. The image state neural networks can be configured to detect various states (e.g., binary image conditions (e.g., face mask on/face mask off, eye blink yes/eye blink no, etc.)) or other more complex state values. The state values can be used in authentication credential processing. In one example, the system can employ an image state value to select an embedding generation neural network or to select a neural network to process an input authentication credential, among other options. In one example, a detection helper network can include a face mask detection DNN configured to determine if image data includes an entity wearing a face mask.

In further example, the system can also execute face mask detection algorithms to determine if a subject is wearing a mask. Stated broadly, masks used during enrollment lower subsequent prediction performance. In some embodiments, the face+mask on/off detection DNN accepts a face input image (e.g., a forward-looking facial image) and returns a value 0 to 100, where 0 is mask off and 100 is mask on. Various thresholds can be applied to a range of values to establish an on/off state.

In one example, a web client can include a URL parameter for enrollment and prediction (e.g., "maskCheck=true"), and based on the output (e.g., state=Mask On) can communicate real-time instructions to the user to remove the mask. In other examples, the system can be set to automatically select a face+mask embedding DNN tailored to process images with face and masks. In various embodiments, the face+mask embedding DNN is a specialized pre-trained neural network configured to process user image data where the user to be authenticated is wearing a mask. A corresponding classification network can be trained on such data (e.g., one-way encryptions of image data where users are in masks), and once trained to predict matches on user's wearing masks.

In another embodiment, a helper network can be configured to determine a state of image data where a user is or is not wearing glasses. In one example, a detection helper network can include an eyeglasses detection DNN configured to determine if image data includes an entity wearing eyeglasses. In further example, the system can also execute eyeglass helper network to determine if a subject is wearing eyeglasses. In one example, the system can also execute an eyeglass detection algorithm to determine if a subject is wearing eyeglasses before allowing enrollment. Stated broadly, eyeglasses used during enrollment can lower subsequent prediction performance. In some embodiments, the eyeglasses on/off detection DNN accepts a front view of face input image, returns a value 0 to 100, where 0 is eyeglasses off and 100 is eyeglasses on. In some embodiments, various thresholds can be applied to a range of values to establish an on/off state. For example, values above 60 can be assigned to an on state with values below 40 assigned to an off state (or, for example, above 50/below 50). Intermediate values can be deemed inconclusive or in other embodiments the complete range between 0 to 100 can be assigned to either state.

Various authentication system can test if a user is wearing glasses. For example, a web client can include a URL parameter for enrollment and prediction (e.g., "eyeGlassCheck=true"), and based on the output (e.g., state=Glasses On) can communicate real-time instructions to the user to remove the glasses. In other embodiments, generation/classification networks can be trained on image data of a user with glasses and the associated networks can be selected based on processing images of users with glasses and predicting on encrypted representations of the same.

In another embodiment, a helper network can include an eye geometry detection DNN. The detection DNN is configured to locate eye(s) in an image by transforming a front facing facial image into geometric primitives and measuring relative position of the geometric primitives. In one example, the DNN is configured to return positional information (e.g., x, y coordinates) of eyes in an image, video frame or video stream.

In one embodiment, a helper network can include an eyes open/closed detection DNN. For example, a real-time determination that an entity seeking authentication is blinking provides real-time passive facial liveness confirmation. Determining that a user is actually submitting their authentication information at the time of the authentication request prevents spoofing attacks (e.g., holding up an image of an authentic user). In various examples, the system can include algorithms to test liveness and mitigate the risk of a photo or video spoofing attack during unattended operation. In one example, the eye open detection DNN receives an input image of an eye and outputs a validation score between 0 and 100, where 0 is eyes closed and 100 is eyes open. Various thresholds can be applied to a range of values to establish an eye open/closed state as discussed herein.

According to one embodiment, the authentication system prevents a user/entity from proceeding until the detection of a pair of eye-open/eye-closed events. In one example, the web client can be configured with a URL parameter "faceLiveness=true" that allows the system to require an eye-blink check. The parameter can be used to change operation of blinking testing and/or default settings. In further examples, rates of blinking can be established and linked to users as behavioral characteristics to validate.

In some embodiments, helper networks can be configured to augment authentication credential data. For example, a helper network can include facial and fingerprint augmentation DNNs that are used as part of training validation networks. In various embodiments, data augmentation via helper networks is configured to generalize the enrollment of authentication information, improve accuracy and performance during subsequent prediction, and allow the classification component and/or subsystem to handle real-world conditions. Stated generally, enrollment can be defined on the system to require a certain number of instances to achieve a level of accuracy while balancing performance. For example, the system can require >50 instances of an authentication credential (e.g., >50 biometric input images) to maintain accuracy and performance. The system can be configured to execute algorithms to augment valid credential inputs to reach or exceed 50 instances. For example, a set of images can be expanded to 50 or more instances that can also be broadened to add boundary conditions to generalize the enrollment. The broadening can include any one or more and/or any combination of: enhanced image rotations flips, color and lighting homogenizations, among other options. Each instance of an augmentation can be tested to require improvement in evaluation of the distance metric (Euclidean distances or cosine similarity) comparison, and also be required not to surpass class boundaries. For example, the system can be configured to execute algorithms to remove any authentication credentials (e.g., images) that exceed class boundaries. Once filtered, the remaining images challenge the distance metric boundaries without surpassing them.

In the example of image data used to authenticate, if only one image is available for enrollment, the system is configured to augment the facial input image >50 (e.g., 60, 70, 80, etc.) times, remove any outliers, and then enroll the user. According to one embodiment, the web client is configured to capture 8 images, morph each image, for example, 9 times, remove any outliers and then enroll the user. As discussed, the system can be configured to require a baseline number of instances for enrollment. For example, enrollment can require >50 augmented biometric input images to maintain the health, accuracy, and performance of the recognition operations. In various embodiments, the system accepts biometric input image(s), morphs and homogenizes the lighting and contrast once, and discards the original images once encrypted representations are produced.

It is realized that that there is no intrinsic requirement to morph images for prediction. Thus, some embodiments are configured to morph/augment images only during enrollment. In other embodiments, the system can also be configured to homogenize images submitted for prediction (e.g., via HSL transforms, etc.). In some examples, homogenized images used during prediction can increase system performance when compared to non-homogenized images. According to some examples, image homogenization can be executed based on convenience libraries (e.g., in Python and JavaScript). According to some embodiments, during prediction the web client is configured to capture three images, morph and homogenize the lighting and contrast once, and then discards the original images once encrypted representations are generated.

In various embodiments, helper networks can be configured to support transformation of authentication credentials into encrypted representations by pre-trained neural networks (e.g., referred to as embedding networks or generation networks). The embedding networks can be tailored to specific authentication credential input. According to one embodiment, the system includes face, face+mask, and fingerprint embedding neural networks, among others. Where respective embedding networks are configured to transform the input image to distance measurable one-way homomorphic encryptions (e.g., embedding, or vector encryption) which can be a two-dimensional positional array of 128 floating-point numbers.

In various implementations, face, face+mask, and fingerprint embedding neural networks maintain full accuracy through real-world boundary conditions. Real world conditions have been tested to include poor lighting; inconsistent camera positioning; expression; image rotation of up to 22.5°; variable distance; focus impacted by blur and movement; occlusions of 20-30% including facial hair, glasses, scars, makeup, colored lenses and filters, and abrasions; and B/W and grayscale images. In various embodiments, the embedding neural networks are architected on the Mobile- NetV2 architecture and are configured to output a one-way encrypted payload in <100 ms.

In various embodiments, voice input can include additional processing. For example, the system can be configured to execute voice input segmentation that generalizes the enrollment data, improves accuracy and performance during prediction, and allows the system to handle real-world conditions. In various embodiments, the system is configured to require >50 10 ms voice samples, to establish a desired level of accuracy and performance. In one example, the system is configured to capture voice instances based on a sliding 10 ms window that can be captured across one second of voice input, which enables the system to reach or exceed 50 samples.

In some embodiments, the system is configured to execute pulse code modulation to reduce the input to two times the frequency range, and PCM enables the system to use the smallest possible Fourier transform without computational loss. In other embodiments, the system is configured to execute voice fast fourier transform (FFT) which transforms the pulse code modulated audio signal from the time domain to a representation in the frequency domain. According to some examples, the transform output is a 2-dimensional array of frequencies that can be input to a voice embedding DNN. For example, the system can include a voice embedding network that is configured to accept input of one 2-dimensional array of frequencies and transform the input to a 4 kB, 2-dimensional positional array of 128 floating-point numbers (e.g., cosine-measurable embedding and/or 1-way vector encryption), and then deletes the original biometric.

According to various embodiments, the web client can be configured to acquire authentication credentials (e.g., biometrics) at the edge with or without a network. For example, the web client can be configured to automatically switch to a local mode after detection of loss of network. According to some embodiments, the web client can support offline operation ("local mode") using Edge computing. In one example, the device in local mode authenticates a user using face and fingerprint recognition, and can do so in 10 ms with intermittent or no Internet connection as long as the user authenticates at least once to the device while online. In some embodiments, the device is configured to store the user's embeddings and/or encrypted feature vectors locally using a web storage API during the prediction.

Figure 9:
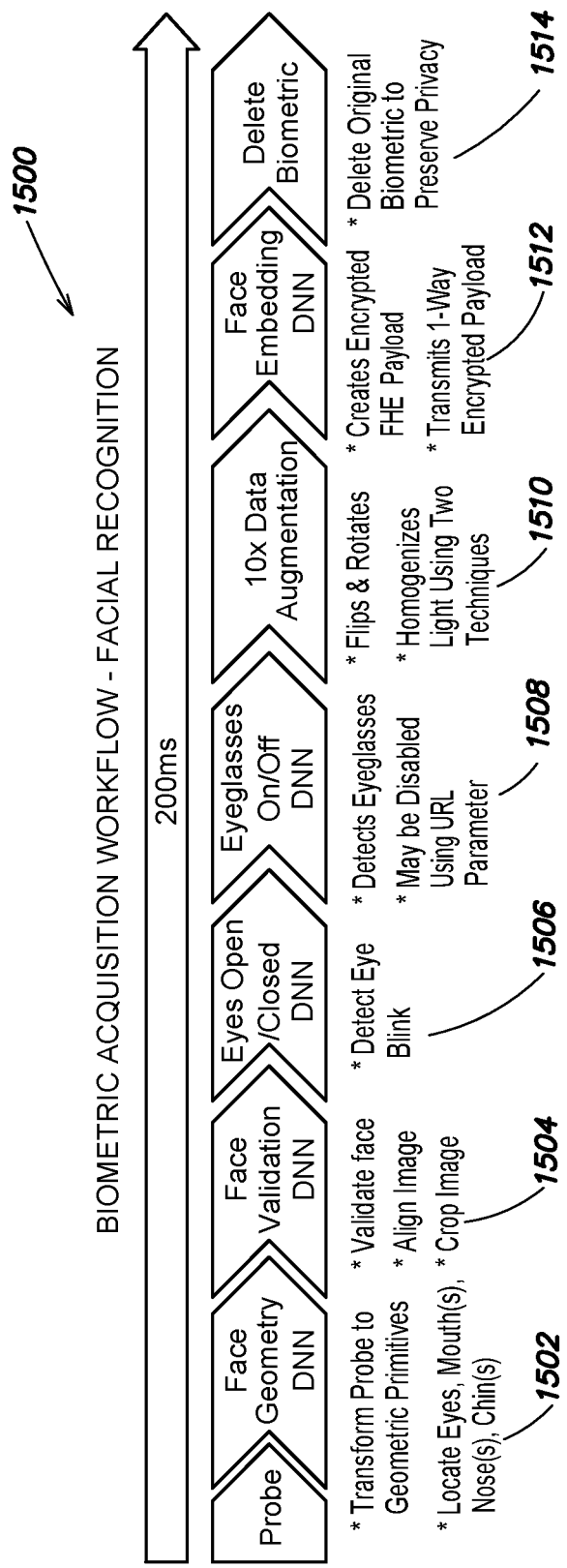
FIG. 9 is an example process flow for processing authentication information, according to one embodiment.

FIG. 9 illustrates an example process flow 1500 for facial recognition according to one embodiment. At 1502 facial image data is processed by a face geometry neural network using a probe. As part of execution of 1502, the neural network operates to transform the input data into geometric primitives and uses the geometric primitives to locate facial structures including, for example, eyes, mouth, nose, chin, and other relevant facial structures. Based on the analysis of the geometric primitives positional information can be output as part of 1502, and the positional information can be used in subsequent processing steps. For example, process 1500 can continue 1504 with processing via a face validation neural network. The processing of 1504 can include validation of the image data is including facial structures, information, and may employ the position information developed in 1502. In further example, processing and validation in 1502-1504 can include operations to align an input image on facial features and can include additional operations to crop an input image around relevant facial features (e.g., using position information). Process 1500 continues at 1506 with processing by an eyes open/closed neural network. The neural network is configured to detect whether facial input data includes transitions between eyes open and closed states, which is indicative of a live person or more specifically a blinking person during use of the authentication functions. According to some embodiments, detection of blinking can be used to validate "liveness" of authentication information submission (e.g., not spoofed submission).

According to some embodiments, the process flow 1500 can also include operations to detect whether the user is wearing glasses. For example, at 1508, submitted user data can be processed to determine if a submitted image includes the user wearing eyeglasses or not. In one example, an image capture is processed through a neural network (e.g., eyeglasses on/off neural network) to determine if the image data includes the user wearing eyeglasses or not. The system can be configured to respond to the determination in a variety of ways. In one example if eyeglasses are detected a user may be requested to re-image their face for authentication. In other examples, the system can be configured to use different neural networks to process the image data. For example, a first neural network can be configured to process image data in which users are wearing glasses and a second different neural network to process image data of users (e.g., even the same user) when wearing glasses. The state determination glasses on/off can be used to select between such networks.

In some embodiments, process 1500 can include data augmentation operations. For example, at 1510, data augmentation can be executed to flip and rotate acquired images, and/or morph acquired images to achieve a system defined requisite number of image samples. Various embodiments are configured to confirm and validate input authentication information prior to performing data expansion operations (e.g., 1510). Ensuring valid data and filtering bad data ensures the accuracy of any resulting enrollment. In another example at 1510, data augmentation neural networks can be employed to homogenize lighting conditions for submitted image data. In another example at 1510, data augmentation neural networks can be employed to homogenize lighting conditions for submitted image data. According to various embodiments, multiple techniques can be used to augment and/or homogenize the lighting for a subject image. In one example, two homogenization techniques are used to update the image data.

As shown in process flow 1500, a number of steps can be executed prior to creation of encrypted feature vectors/embeddings that are one-way encrypted representations of submitted authentication inputs. In other embodiments, the processing can be omitted and/or executed in fewer steps and such process flows can be reduced to functions for creation of one-way encryptions of authentication credentials by an embedding network (e.g., at 1512). In still other embodiments, processing to validate authentication inputs can be executed to improve enrollment and subsequent authentication can be handled by other processes and/or systems.

According to various embodiments, the process 1500 includes steps 1502 through 1510 which can be performed by various helper networks that improve the data provided for enrollment and creation of one-way encryptions of submitted authentication information that are derived to be measurable in their encrypted form. For example, the operations performed at 1502 through 1510 can improve the data input to an embedding network that is configured to take a plain text input and produce a one-way encrypted output of the authentication information. As shown in the process flow 1500, once an encrypted representation of an authentication input is produced, the original authentication credential (e.g., original biometric) can be deleted at 1514.

Figure 10:
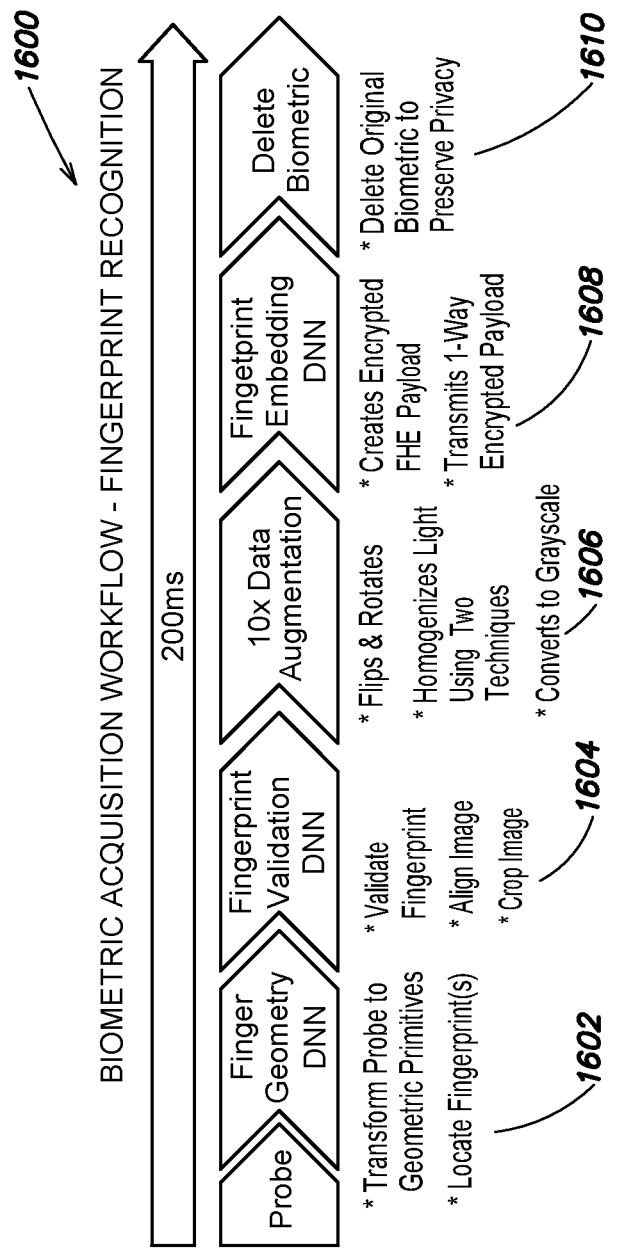
FIG. 10 is an example process flow for processing authentication information, according to one embodiment.

FIG. 10 is an example process flow 1600 for biometric acquisition of a fingerprint. At 1602, image data captured by a probe is transformed into geometric primitives based on input to a fingerprint geometry neural network (e.g., a fingerprint geometry DNN). The neural network can be configured to transform image data into geometric primitives and locate fingerprints within the image data based on analysis of the geometric primitives, relative spacing, boundaries, structures, etc. In some embodiments, output of the fingerprint geometry DNN can include positional information for fingerprints and/or characteristics within the image data.

In step 1604, submitted data can be processed to determine validity. For example, the image data can be input into a fingerprint validation neural network at 1604. In one example, the fingerprint validation neural network can be architected as a DNN. The neural network can be configured to validate a proper fingerprint capture exists in the image data (e.g., based on analysis of the image data by the neural network and/or geometric primitives produced by the fingerprint geometry neural network). In further embodiments the fingerprint validation neural network can also be configured to determine the validity of the submitted fingerprint data. For example, the validity helper network can be configured to determine that a live sample (and not spoofed) is being presented, as well as validating the input as a good authentication data source.

Similar to process 1500, process 1600 includes operations to augment data submission. Data augmentation (e.g., 1606) can be executed as part of enrollment to ensure a threshold number of data instances are provided during enrollment. In various embodiment, process flow 1600 is configured to validate authentication inputs to ensure good inputs are augmented for training further models.

In further examples, data augmentation can also be used during prediction operations. In one example, data augmentation during prediction can be limited to homogenizing light conditions for submitted image data (e.g., face image, fingerprint image, other image, etc.). According to one embodiment, fingerprint image data is manipulated to improve the image data and or create additional instances as part of data augmentation steps. Manipulation can include image flips, rotations, skews, offsets, cropping, among other options. Operations executed during data augmentation can also include homogenization of the lighting conditions for an input image (e.g., transform into HSL). Various lighting homogenization functions can be executed on the image data. In one example, the system is configured to execute at least two homogenization techniques to standardize lighting conditions. According to some embodiments, the operations of 1606 can also include conversion of the image to a grayscale image.

Steps 1602 through 1606 can be executed to improve and/or prepare fingerprint image data for enrollment by a fingerprint embedding neural network (e.g., at 1608). The fingerprint embedding neural network is configured to generate one-way distance measurable encrypted representations of input authentication credentials. For example, the fingerprint embedding neural network can be architected as a deep neural network. The fingerprint embedding DNN can be configured to create one-way homomorphic encryptions of input fingerprint data. Once the encrypted representations are produced, the encrypted representations can be used in subsequent operations (e.g., classification and/or prediction), and the process flow 1600 can include a step (e.g., 1610) to delete any original authentication credential information, including any original biometric.

Figure 11:
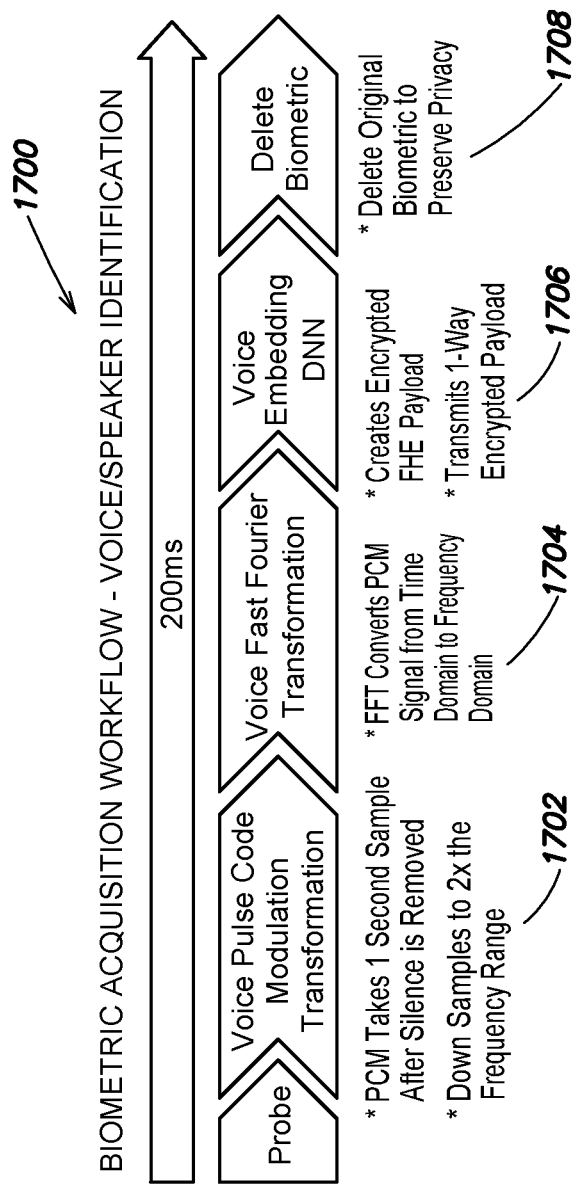
FIG. 11 is an example process flow for processing authentication information, according to one embodiment.

FIG. 11 is an example process flow 1700 for acquisition of vocal authentication credentials. According to one embodiment, process 1700 can begin based on transformation of voice data captured by a probe at 1702. According to one example, input voice data is transformed based on voice pulse code modulation (PCM). Processing of the audio data can include capturing samples of time segments from the audio information. In one example, silence is removed from the audio information and PCM is executed against one second samples from the remaining audio data. In other embodiments, different sample sizes can be used to achieve a minimum number of authentication instances for enrollment and/or prediction. According to some embodiments, the PCM operation is configured to down sample the audio information to two times the frequency range. In other embodiments different down sampling frequencies can be used. Once PCM is complete at 1702, process 1700 continues at 1704 with a fourier transformation of the PCM signal from the time domain to the frequency domain. According to some embodiments, a voice fast fourier transformation operation is executed at 1704 to produce the frequency domain output.

Process 1700 continues at 1706, where the frequency domain output of 1704 can be input into a voice embedding neural network. According to some embodiments, the voice embedding neural network can include or be based on a deep neural network architecture. As discussed herein, the embedding neural network is configured to produce a one-way encryption of input authentication information. In this example, the voice embedding DNN is configured to generate an encrypted representation of audio/voice data that is geometrically measurable (e.g., cosine measurable). Once the encrypted representation is generated, any original authentication information can be deleted at 1708. For example, once the voice embedding DNN produces its encryption, the original audio input can be deleted to preserve privacy.

Modifications and variations of the discussed embodiments will be apparent to those of ordinary skill in the art and all such modifications and variations are included within the scope of the appended claims. For example, while many examples and embodiments are discussed above with respect to a user or person, and identification/authentication of same, it is realized that the system can identify and/or authenticate any item or thing or entity for which image capture is possible (e.g., family pet, heirloom, necklace, ring, landscape, etc.) or other type of digital capture is possible (e.g., ambient noise in a location, song, signing, specific gestures by an individual, sign language movements, words in sign language, etc.). Once digitally captured the object of identification/authentication can be processed by a first generation/embedding network, whose output is used to train a second classification network, enabling identification of the object in both distance measure and classification settings on fully encrypted identifying information. In further aspects, the authentication systems (e.g., embedding and classification networks) are protected by various helper networks that process and validate authentication data as good or bad sources of data. Filtering of bad data sources protects subsequent embedding models and yields authentication systems that are more accurate and flexible than conventional approaches.

Figure 12:
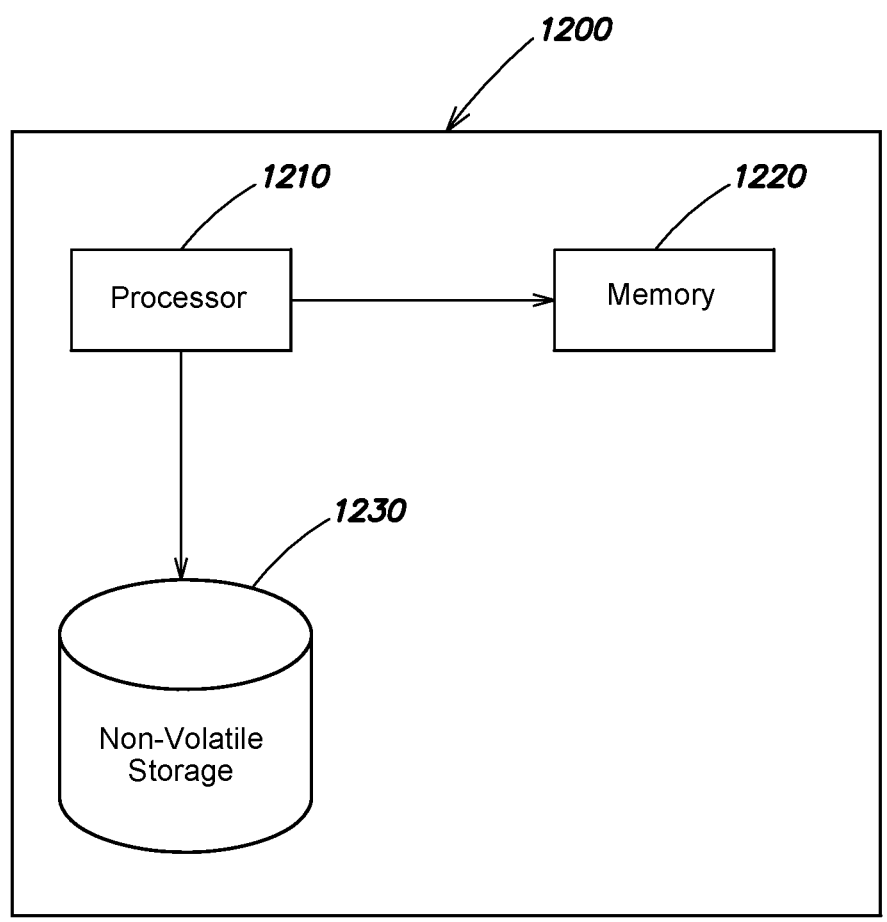
FIG. 12 is block diagram of a special purpose computer system on which the disclosed functions can be implemented.

An illustrative computer system on which the discussed functions, algorithms, and/or neural network can be implements is shown by way of computer system 1200, FIG. 12, which may be used in connection with any of the embodiments of the disclosure provided herein. The computer system 1200 may include one or more processors 1210 and one or more articles of manufacture that comprise non-transitory computer-readable storage media (e.g., memory 1220 and one or more non-volatile storage media 1230). The processor 1210 may control writing data to and reading data from the memory 1220 and the non-volatile storage device 1230 in any suitable manner. To perform any of the functionality described herein, the processor 1210 may execute one or more processor-executable instructions stored in one or more non-transitory computer-readable storage media (e.g., the memory 1220), which may serve as non-transitory computer-readable storage media storing processor-executable instructions for execution by the processor 1210.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

As described herein "authentication system" includes systems that can be used for authentication as well as systems that be used for identification. Various embodiments describe helper networks that can be used to improve operation in either context. The various functions, processes, and algorithms can be executed in the context of identifying an entity and/or in the context of authenticating an entity.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIGS. 4-7, 9-11, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. A system for managing privacy-enabled identification or authentication, the system comprising:
  at least one processor operatively connected to a memory;
  an identification data gateway, executed by the at least one processor, configured to filter invalid identification information from subsequent verification, enrollment, identification, or authentication functions, the identification data gateway comprising at least:

a first pre-trained validation helper network trained on identification information of a first type, wherein the first pre-trained validation helper network is configured to:
- evaluate an identification instance of the first type, responsive to input of the identification instance of the first type to the first pre-trained validation helper network, wherein the first pre-trained validation helper network is pre-trained on characteristics independent of establishing identification of a target of identification reflected in the identification instance;
- responsive to a determination that the identification instance meets the evaluation criteria, validate the identification instance for use in subsequent verification, enrollment, identification, or authentication functions;
- responsive to a determination that the identification instance fails the evaluation criteria, reject the unknown information instance for use in subsequent verification, enrollment, identification, or authentication functions; and
- wherein the determination generates at least a binary evaluation of the identification information instance, wherein at least the binary evaluation includes: a probabilistic evaluation of the identification information instance; generation of a probability that the identification instance is valid or invalid; and evaluation of the probability against a threshold to determine that the identification instance is valid or invalid.

2. The system of claim 1, wherein the identification data gateway is configured to filter bad audio data from use in subsequent identification of an audio target.

3. The system of claim 1, wherein the identification data gateway is configured to accept audio data input and validate the audio input for use in identifying an audio target.

4. The system of claim 3, wherein the at least one processor is further configured to communicate validated audio input for use in enrolling an audio target for subsequent identification.

5. The system of claim 3, wherein the at least one processor is further configured to produce as an output from an embedding network an encrypted audio identification instance responsive to input of the identification instance of the first type to the embedding network.

6. The system of claim 5, wherein the at least one processor is configured to associate the encrypted audio identification instance to a unique identifier for the audio target.

7. The system of claim 1, wherein the first pre-trained validation helper network is trained on presence data, and configured to determine the presence of a target to be evaluated.

8. The system of claim 1, wherein the target is any item or thing or entity on which identification is requested.

9. The system of claim 1, wherein the authentication data gateway further comprises a plurality of validation helper networks each associated with a respective type of identification information, wherein each of the plurality of validation helper networks generate a binary evaluation of respective identification inputs to establish validity, wherein at least a plurality of the validation helper networks are configured to validate respective identification information independent of the target of identification.

10. A method for managing privacy-enabled identification or authentication, the method comprising:
filtering, by at least one processor, invalid identification information from subsequent verification, enrollment, identification, or authentication functions, wherein filtering includes:
- instantiating a first pre-trained validation helper network trained on identification information of a first type;
- evaluating, by the first pre-trained validation helper network an identification instance of the first type, responsive to input of the identification instance of the first type to the first pre-trained validation helper network, wherein the first pre-trained validation helper network is pre-trained on one or more evaluation criteria that are characteristics independent of establishing identification of a target of identification reflected in the identification instance;
- determining, by the first pre-trained validation helper network that the identification instance meets or fails the evaluation criteria;
- validating the identification instance for use in subsequent verification, enrollment, identification, or authentication functions responsive to determining the identification instance meets the evaluation criteria;
- rejecting the unknown information instance for use in subsequent verification, enrollment, identification, or authentication functions responsive to determining the identification instance fails the evaluation criteria; and
- wherein the act of determining includes generating at least a probabilistic evaluation of the identification information instance, wherein at least the probabilistic evaluation includes generation of a probability that the identification instance is valid or invalid based on evaluating the probability against a threshold for determining that the identification instance is valid or invalid.

11. The method of claim 10, further comprising filtering bad audio data from use in subsequent identification of an audio target.

12. The method of claim 10, further comprising accepting audio data input and validating the audio input for use in identifying an audio target.

13. The method of claim 12, further comprising communicating validated audio input for use in enrolling an audio target for subsequent identification.

14. The method of claim 12, further comprising producing as an output from an embedding network an encrypted audio identification instance responsive to input of the identification instance of the first type to the embedding network.

15. The method of claim 14, further comprising associating the encrypted audio identification instance to a unique identifier for the audio target.

16. The method of claim 10, wherein the first pre-trained validation helper network is trained on presence data, and the method further comprises determining the presence of a target to be evaluated.

17. The method of claim 10, wherein the target is any item or thing or entity on which identification is requested.

18. The method of claim 10, further comprising instantiating a plurality of validation helper networks each associated with a respective type of identification information, wherein each of the plurality of validation helper networks generates a probabilistic evaluation of respective identification inputs to establish validity, and the method further comprises validating respective identification information independent of the identity of the target of identification.

* * * * *